United States Patent
Hong et al.

(10) Patent No.: US 11,966,907 B2
(45) Date of Patent: Apr. 23, 2024

(54) SYSTEM AND METHOD FOR MOBILE CROSS-AUTHENTICATION

(71) Applicant: YoongNet Inc., Seoul (KR)

(72) Inventors: Seung Eun Hong, Seoul (KR); Paul Hong, Seoul (KR)

(73) Assignee: YoongNet Inc., Seoul (KR)

( * ) Notice: Subject to any disclaimer, the term of this patent is extended or adjusted under 35 U.S.C. 154(b) by 418 days.

(21) Appl. No.: 17/239,442

(22) Filed: Apr. 23, 2021

(65) Prior Publication Data

US 2021/0266312 A1     Aug. 26, 2021

Related U.S. Application Data

(63) Continuation-in-part of application No. 15/521,748, filed as application No. PCT/KR2015/010762 on Oct. 13, 2015, now abandoned.

(30) Foreign Application Priority Data

Oct. 25, 2014    (KR) ........................ 10-2014-0145593

(51) Int. Cl.
*G06Q 20/32*          (2012.01)
*G06Q 20/38*          (2012.01)
(Continued)

(52) U.S. Cl.
CPC ....... *G06Q 20/3226* (2013.01); *G06Q 20/385* (2013.01); *G06Q 20/02* (2013.01);
(Continued)

(58) Field of Classification Search
None
See application file for complete search history.

(56) References Cited

U.S. PATENT DOCUMENTS 5,613,012 A     3/1997   Hoffman
5,771,291 A *   6/1998   Newton ................. G06F 21/46
                                                                 713/185
(Continued)

FOREIGN PATENT DOCUMENTS

CA         3029516 A1 *   1/2018   ........... G06F 21/316
CN     102368338 A    *   3/2012   ......... G06Q 20/1085
(Continued)

OTHER PUBLICATIONS

E. Grosse and M. Upadhyay, "Authentication at Scale," in IEEE Security & Privacy, vol. 11, No. 1, pp. 15-22, Jan.-Feb. 2013. https://ieeexplore.ieee.org/abstract/document/6381399 (Year: 2013).*
(Continued)

*Primary Examiner* — El Mehdi Oussir
(74) *Attorney, Agent, or Firm* — Bridgeway IP Law Group, PLLC; Jihun Kim

(57) ABSTRACT

The present invention relates to a system and a method for mobile cross-authentication comprising: generating an online authentication code (Ocode) and a mobile authentication code (Mcode) from an authentication server device when performing online authentication, providing the online authentication code (Ocode) and the mobile authentication code (Mcode) to a computer terminal device and a mobile terminal of the user respectively, receiving and verifying the online authentication code and the mobile authentication code received by the computer terminal device and the mobile terminal to the authentication server device through the mobile terminal and the computer terminal device respectively.

4 Claims, 11 Drawing Sheets

(51) Int. Cl.
  *G06Q 20/02* (2012.01)
  *G06Q 20/40* (2012.01)
  *H04L 9/40* (2022.01)
  *H04W 4/14* (2009.01)
  *H04W 12/06* (2021.01)

(52) U.S. Cl.
  CPC ....... *G06Q 20/027* (2013.01); *G06Q 20/3255* (2013.01); *G06Q 20/4097* (2013.01); *H04L 63/0853* (2013.01); *H04W 4/14* (2013.01); *H04W 12/06* (2013.01)

(56) References Cited

U.S. PATENT DOCUMENTS

| | | | |
|---|---|---|---|
| 5,870,723 A | 2/1999 | Pare, Jr. | |
| 6,327,578 B1 | 12/2001 | Linehan | |
| 7,631,193 B1 | 12/2009 | Hoffman | |
| 7,813,822 B1* | 10/2010 | Hoffberg | H04N 7/163 381/73.1 |
| 7,996,288 B1 | 8/2011 | Stolfo | |
| 8,554,675 B2 | 10/2013 | Gupta | |
| 8,660,948 B2 | 2/2014 | Dessert | |
| 8,996,423 B2 | 3/2015 | Johnson | |
| 9,047,728 B1 | 6/2015 | Yudayam | |
| 9,407,631 B1* | 8/2016 | Triandopoulos | H04L 63/0807 |
| 9,600,815 B1 | 3/2017 | Ellis | |
| 11,151,820 B1* | 10/2021 | Klein | G06Q 50/265 |
| 11,157,582 B2* | 10/2021 | Bergel | G06Q 30/0225 |
| 11,303,630 B2* | 4/2022 | Dedieu | H04L 63/0442 |
| 11,477,654 B1* | 10/2022 | Kahn | H04W 12/35 |
| 11,533,619 B1* | 12/2022 | Kahn | H04W 12/068 |
| 11,564,266 B1* | 1/2023 | Kahn | H04W 12/69 |
| 2003/0105725 A1 | 6/2003 | Hoffman | |
| 2005/0091338 A1* | 4/2005 | de la Huerga | G07C 9/28 709/217 |
| 2005/0102188 A1 | 5/2005 | Hutchison | |
| 2007/0078734 A1* | 4/2007 | Oren | G06Q 20/102 705/40 |
| 2007/0186107 A1* | 8/2007 | Sonetaka | G06Q 20/4014 713/170 |
| 2007/0186116 A1* | 8/2007 | Clemmensen | G06F 21/34 713/186 |
| 2007/0271149 A1 | 11/2007 | Siegel | |
| 2008/0201576 A1* | 8/2008 | Kitagawa | H04L 63/08 713/168 |
| 2009/0287837 A1* | 11/2009 | Felsher | G06F 21/6245 709/229 |
| 2010/0030697 A1 | 2/2010 | Goodrich | |
| 2010/0241857 A1* | 9/2010 | Okude | H04W 12/50 713/168 |
| 2010/0257612 A1 | 10/2010 | McGuire | |
| 2010/0274692 A1 | 10/2010 | Hammad | |
| 2010/0275010 A1* | 10/2010 | Ghirardi | H04L 63/0838 726/5 |
| 2010/0276484 A1 | 11/2010 | Banerjee | |
| 2011/0251892 A1 | 10/2011 | Laracey | |
| 2011/0258090 A1 | 10/2011 | Bosch | |
| 2012/0010930 A1 | 1/2012 | Langdon | |
| 2012/0018506 A1* | 1/2012 | Hammad | G06Q 20/385 235/375 |
| 2012/0023567 A1* | 1/2012 | Hammad | G06Q 20/4018 726/9 |
| 2012/0109824 A1 | 5/2012 | Takatori | |
| 2012/0130866 A1 | 5/2012 | Cooke | |
| 2012/0191569 A1 | 7/2012 | Shah | |
| 2012/0323690 A1* | 12/2012 | Michael | G01C 21/3605 705/14.58 |
| 2013/0159021 A1* | 6/2013 | Felsher | G16H 10/60 705/3 |
| 2013/0297387 A1* | 11/2013 | Michael | G06Q 30/02 705/13 |
| 2013/0304616 A1* | 11/2013 | Raleigh | G06Q 40/10 705/34 |
| 2014/0006128 A1 | 1/2014 | Grigg | |
| 2014/0025443 A1* | 1/2014 | Onischuk | G07C 13/00 705/12 |
| 2014/0046842 A1 | 2/2014 | Irudayam | |
| 2014/0089078 A1 | 3/2014 | Dessert | |
| 2014/0108263 A1 | 4/2014 | Ortiz | |
| 2014/0164241 A1 | 6/2014 | Neuwirth | |
| 2014/0358777 A1* | 12/2014 | Gueh | G06Q 20/1085 705/43 |
| 2014/0380508 A1* | 12/2014 | Cao | G06Q 20/386 726/28 |
| 2015/0213435 A1 | 7/2015 | Douglas | |
| 2015/0371212 A1 | 12/2015 | Giordano | |
| 2016/0063476 A1 | 3/2016 | Baldie | |
| 2016/0210578 A1* | 7/2016 | Raleigh | G06Q 30/04 |
| 2016/0248782 A1* | 8/2016 | Troesch | H04L 63/108 |
| 2019/0005494 A1* | 1/2019 | Hammad | G06Q 20/085 |
| 2019/0241090 A1* | 8/2019 | Wakitani | B60L 58/13 |
| 2021/0258308 A1* | 8/2021 | Avetisov | H04L 9/3215 |
| 2022/0360608 A1* | 11/2022 | Raleigh | H04L 47/2408 |
| 2023/0281653 A1* | 9/2023 | Doumar | G06F 21/6245 379/88.22 |

FOREIGN PATENT DOCUMENTS

| | | | | |
|---|---|---|---|---|
| CN | 102402773 A | * | 4/2012 | ............ G06Q 30/00 |
| CN | 103984976 A | * | 8/2014 | ............ G06F 21/44 |
| CN | 104796385 A | * | 7/2015 | ............ H04L 67/02 |
| CN | 105052072 A | * | 11/2015 | ........... H04L 9/3228 |
| CN | 106688004 A | * | 5/2017 | ............ G06Q 20/12 |
| CN | 108369620 A | * | 8/2018 | ............ G06F 21/34 |
| CN | 111770075 B | * | 12/2022 | ............ G06Q 10/02 |
| CN | 115474194 A | * | 12/2022 | |
| DE | 102005063649 B3 | * | 3/2019 | ........... G02B 5/1828 |
| FR | 3017730 A1 | * | 8/2015 | ............ G06F 21/34 |
| JP | 6592573 B1 | * | 10/2019 | ............ G06F 21/31 |
| KR | 1020000012607 A | | 3/2000 | |
| KR | 1020040106098 A | | 12/2004 | |
| KR | 20070077569 A | * | 1/2006 | |
| KR | 1020070082179 A | | 8/2007 | |
| KR | 20100134200 A | * | 6/2009 | |
| KR | 1020120037330 A | | 4/2012 | |
| KR | 1020120071945 A | | 7/2012 | |
| KR | 1020120100342 A | | 9/2012 | |
| KR | 101432977 B1 | | 8/2014 | |
| KR | 20180110298 A | * | 3/2017 | |
| WO | WO-2013166216 A1 | * | 11/2013 | ......... G01C 21/3461 |
| WO | WO-2014032549 A1 | * | 3/2014 | ............ G06Q 20/32 |
| WO | WO-2014149652 A1 | * | 9/2014 | ........... G06Q 20/145 |

OTHER PUBLICATIONS

Sun et al. TrustOTP: Transforming Smartphones into Secure One-Time Password Tokens. https://www.cs.wm.edu/~ksun/publications/TrustOTP-ccs2015.pdf (Year: 2015).*
International Search Report for PCT/KR2015/010762 dated Feb. 12, 2016.
Kuan-Chieh Liao, et al. A Novel User Authentication Scheme Based on QR-Code. 2010, August 8. (Year: 2010).

* cited by examiner

FIG. 10A
FIG. 10B
FIG. 10C
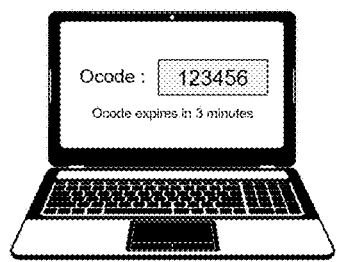
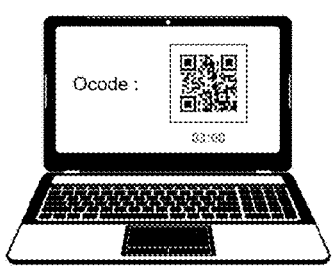
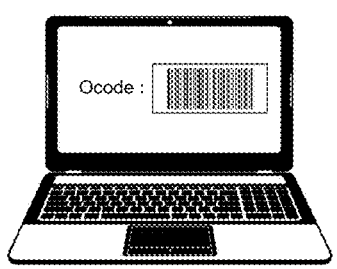
FIG. 11A
FIG. 11B
FIG. 11C
FIG. 11D
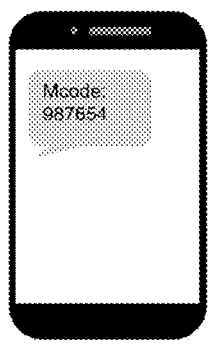
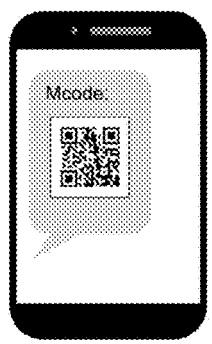
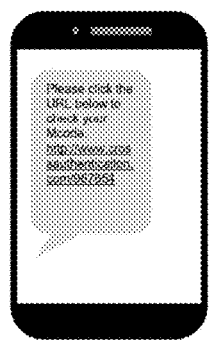

SYSTEM AND METHOD FOR MOBILE CROSS-AUTHENTICATION

CROSS-REFERENCE TO RELATED APPLICATIONS

The present application is a continuation-in-part of U.S. patent application Ser. No. 15/521,748 filed on Apr. 25, 2017, which is a National Stage Entry of International Patent Application No. PCT/KR2015/010762 filed on Oct. 13, 2015, which is based upon and claims the benefit of priority to Korean Patent Application No. 10-2014-0145593 filed on Oct. 25, 2014. The disclosures of the above-listed applications are hereby incorporated by reference herein in their entirety.

TECHNICAL FIELD

The present invention relates to a user authentication system and method for login and financial transactions such as payment settlement, stock trading, and transfers, and more particularly, to a mobile cross-authentication system and method for performing mutual authentication during online authentication, in which an authentication server device generates an online authentication code (Ocode) and a mobile authentication code (Mcode), the online authentication code (Ocode) is provided to a user's computer terminal device, the mobile authentication code (Mcode) is provided to a user's portable terminal device, the online authentication code (Ocode) received by the user's computer terminal device is input into the user's portable terminal device to be transmitted to the authentication server device, and the mobile authentication code (Mcode) received by the user's portable terminal device is input into the user's computer terminal device to be transmitted to the authentication server device.

BACKGROUND ART

As the Internet becomes popular and general, people are receiving various services through the Internet. People purchase products through e-commerce, use Internet banking such as an account transfer, and access various websites to receive information.

As described above, in order to have various online services, people are accustomed to a method of inputting and storing personal information and financial information through the Internet. Financial fraudsters are exploiting the above method so that important personal information is hacked and leaked, thereby causing mental and financial damage to people.

In order to prevent such personal information leakage and financial fraud, authentication techniques, in which digital signature authentication based on an accredited certificate, a one-time password (OTP), mobile phone authentication, automatic response system (ARS) authentication, or the like is added to or combined with a technique using identification (ID) and a password, have been applied basically.

However, a digital signature authentication technique has been threatened with security thereof due to a leakage and theft of an accredited certificate, and in order to solve this problem, although a technique of safely storing an accredited certificate using a security token or a universal subscriber identity module (USIM) is disclosed in the prior laid-open patent documentation 10-2012-0100342 and the prior laid-open patent documentation 10-2012-0071945, there has been a problem in that the burden of using a separate hardware device is increased and the techniques have to be dependent on a specific hardware module.

In addition, due to the emergence of hacking techniques such as memory hacking, the financial authentication methods that use accredited certificates and OTP devices have also become ineffective against financial fraud, resulting in financial fraud and social problems.

Financial fraud or the like occurs in existing mobile phone authentication methods due to steal of a short message service (SMS) authentication code such as smishing, and even in the case of existing ARS authentication, problems caused by call forwarding have been revealed and a security threat is posed.

In addition, although a virtual card number is provided in the case of app card methods, because there is a limitation in that an application has to be downloaded to a smart phone, usability of the app card methods is lowered, and the app card methods cannot be applied as an authentication method of a user using a general mobile phone.

SUMMARY

The present invention relates to a user authentication system and method for login and financial transactions such as payment settlement, stock trading, and transfers, and more particularly, to a mobile cross-authentication system and method capable of performing authentication during online authentication, in which an authentication server device generates an online authentication code (Ocode) and a mobile authentication code (Mcode), the online authentication code (Ocode) is provided to a user's computer terminal device, the mobile authentication code (Mcode) is provided to a user's portable terminal device, the online authentication code (Ocode) received by the user's computer terminal device is input into the user's portable terminal device to be transmitted to the authentication server device, the mobile authentication code (Mcode) received by the user's portable terminal device is input into the user's computer terminal device to be transmitted to the authentication server device, and thereby a separate smart phone application and a specific hardware module are not needed and authentication is safely performed without theft even when an authentication code is stolen.

One aspect of the present invention provides a mobile cross-authentication system including: a computer terminal device which transmits a signal of an authentication request to a authentication server device when using an arbitrary service configured to need online authentication, transmits and inputs user's portable terminal device identification information (Tel_no) into the authentication server device when the authentication server device requests the user's portable terminal device identification information, receives an online authentication code (Ocode) generated in the authentication server device by the authentication request, displays the online authentication code (Ocode) thereon, receives a mobile authentication code (Mcode) which is generated in the authentication server device by the authentication request and received from the portable terminal device, transmits the mobile authentication code (Mcode) to the authentication server device, and displays an authentication result received from the authentication server device thereon; a portable terminal device which receives the mobile authentication code (Mcode) generated in the authentication server device by the authentication request, displays the mobile authentication code (Mcode) thereon, and receives the online authentication code (Ocode) displayed on the computer terminal device to transmit the online authentication code (Ocode) to the authentication server device; and an authentication server device which receives the signal of the authentication request from the computer terminal device, requests the user's portable terminal device identification information to the computer terminal device, receives the portable terminal device identification information (Tel_no) input from the computer terminal device in response to the request, generates the online authentication code (Ocode) and the mobile authentication code (Mcode) which are respectively provided to the computer terminal device and the portable terminal device, obtains a mobile authentication code (Mcode*) input and received from the computer terminal device, obtains an online authentication code (Ocode*) input and received from the portable terminal device, obtains a portable terminal device number (Dev_no) when the online authentication code (Ocode*) is received, compares the obtained online authentication code (Ocode*) with the online authentication code (Ocode) generated by the authentication request and the obtained mobile authentication code (Mcode*) with the mobile authentication code (Mcode) generated by the authentication request to verify accordance therebetween, compares the obtained portable terminal device number (Dev_no) with the portable terminal device identification information (Tel_no) input from the computer terminal device to verify accordance therebetween, and transmits an authentication result according to the verifications to the computer terminal device.

Here, Mcode* and Ocode* refer to information of a case in which an online authentication code and a mobile authentication code are transmitted and provided from an authentication server device to one device, and input back from the other device The authentication server device may include: an authentication request receiver which receives the signal of the authentication request from the computer terminal device, requests the user's portable terminal device identification information to the computer terminal device, and receives the portable terminal device identification information (Tel_no) input from the computer terminal device in response to the request; an authentication code generator which generates the online authentication code (Ocode) and the mobile authentication code (Mcode) by the authentication request; an online authentication code provider which provides the online authentication code (Ocode) generated by the authentication code generator to the computer terminal device; a mobile authentication code provider which provides the mobile authentication code (Mcode) generated by the authentication code generator to the portable terminal device; a mobile authentication code obtainer which obtains a mobile authentication code (Mcode*) received from the computer terminal device by being input the mobile authentication code (Mcode) displayed on the portable terminal device into the computer terminal device; an online authentication code obtainer which obtains an online authentication code (Ocode*) received from the portable terminal device by being input the online authentication code (Ocode) displayed on the computer terminal device into the portable terminal device; a portable terminal device identification information obtainer which detects and obtains the portable terminal device number (Dev_no) when the online authentication code (Ocode*) is received; an authentication verifier which compares the obtained online authentication code (Ocode*) with the online authentication code (Ocode) generated by the authentication code generator and the obtained mobile authentication code (Mcode*) with the mobile authentication code (Mcode) generated by the authentication code generator to verify accordance therebetween, and compares the obtained portable terminal device number (Dev_no) with the portable terminal device identification information (Tel_no) input from the computer terminal device to verify accordance therebetween; and an authentication result transmitter which transmits an authentication result according to the verifications to the computer terminal device.

The authentication code generator may include an online authentication code generator configured to generate the online authentication code (Ocode) and a mobile authentication code generator configured to generate the mobile authentication code (Mcode), wherein the online authentication code (Ocode) and the mobile authentication code (Mcode) may be generated as one-time random authentication codes and deleted when the online authentication code (Ocode) and the mobile authentication code (Mcode) are unused within a predetermined period from a generated time point thereof.

The authentication verifier may compare the online authentication code (Ocode) generated by the authentication request with the online authentication code (Ocode*) received from the portable terminal device to verify accordance therebetween, compare the mobile authentication code (Mcode) generated by the authentication request with the mobile authentication code (Mcode*) received from the computer terminal device to verify accordance therebetween, and compare the portable terminal device identification information (Tel_no) input from the computer terminal device with the portable terminal device number (Dev_no) detected and obtained when the online authentication code (Ocode*) is received to verify accordance therebetween, and a result according to the authentication request may be determined as authentication success when all the three verifications succeed and be determined as authentication fail even when one of the three verifications fails.

The computer terminal device may include: an authentication requester which transmits the signal of the authentication request to the authentication server device and transmits the portable terminal device identification information (Tel_no) to the authentication server device by the request of the portable terminal device identification information; an online authentication code receiver which receives the online authentication code (Ocode) generated in the authentication server device by the authentication request; an online authentication code displayer which displays the online authentication code (Ocode) received from the authentication server device on a screen of the computer terminal device; an mobile authentication code inputter which inputs the mobile authentication code (Mcode), which is generated in the authentication server device by the authentication request and received from the portable terminal device, into the computer terminal device; a mobile authentication code transmitter which transmits the input mobile authentication code (Mcode) to the authentication server device; and an authentication result displayer which displays an authentication result received from the authentication server device after the authentication server device performs verification.

When an arbitrary service configured to need authentication is used, the computer terminal device may be configured to directly request the authentication to the authentication server device, may further include a payment gateway (PG) server device to be configured to request the authentication to the authentication server device through the PG server device when the computer terminal device requests payment to the PG server device, and may also further include a service server device (the service server device provides services for login, an account transfer, e-commerce, etc.) to be configured to request the authentication to the authentication server device through the service server device when the computer terminal device requests performing a service to the service server device.

The portable terminal device may include: a mobile authentication code receiver which receives the mobile authentication code (Mcode) generated in the authentication server device by the authentication request; a mobile authentication code displayer which displays the mobile authentication code (Mcode) received from the authentication server device on a screen of the portable terminal device; an online authentication code inputter which inputs the online authentication code (Ocode) displayed on the computer terminal device into the portable terminal device 1; and an online authentication code transmitter which transmits the input online authentication code (Ocode) to the authentication server device.

The portable terminal device may receive a message including the mobile authentication code (Mcode) generated by the authentication server device, receive the online authentication code (Ocode) displayed on the computer terminal device, form a message, and transmit the formed message to the authentication server device, and the formed message may be formed as one of mobile communication messages, such as a short message service (SMS) message, a long message service (LMS) message, and a multimedia message service (MMS) message, and smart phone push messages.

Another aspect of the present invention provides a mobile cross-authentication method including: an authentication request process in which a computer terminal device transmits a signal of an authentication request to an authentication server device when using an arbitrary service configured to need online authentication, receives a request of user's portable terminal device identification information from the authentication server device, and transmits a user's portable terminal device identification information (Tel_no) to the authentication server device in response to the request; an authentication code generation process in which the authentication server device generates an online authentication code (Ocode) and a mobile authentication code (Mcode) by the authentication request; an authentication code provision process in which the authentication server device provides the online authentication code (Ocode) generated by the authentication request to the computer terminal device and provides the mobile authentication code (Mcode) generated by the authentication request to the portable terminal device; an authentication code display process in which the computer terminal device displays the online authentication code (Ocode) received from the authentication server device on a screen of the computer terminal device, and the portable terminal device displays the mobile authentication code (Mcode) received from the authentication server device on a screen of the portable terminal device; an authentication code cross-transmission process in which the computer terminal device receives the mobile authentication code (Mcode) displayed on the portable terminal device and transmits the mobile authentication code (Mcode) to the authentication server device, and the portable terminal device receives the online authentication code (Ocode) displayed on the computer terminal device and transmits the online authentication code (Ocode) to the authentication server device; and an authentication verification process in which the authentication server device obtains a mobile authentication code (Mcode*) received from the computer terminal device, obtains an online authentication code (Ocode*) received from the portable terminal device, detects and obtains a portable terminal device number (Dev_no) when the online authentication code (Ocode*) is received, compares the obtained online authentication code (Ocode*) with the online authentication code (Ocode) generated by the authentication request and the obtained mobile authentication code (Mcode*) with the mobile authentication code (Mcode) generated by the authentication request to verify accordance therebetween, compares the obtained portable terminal device number (Dev_no) with the portable terminal device identification information (Tel_no) input from the computer terminal device to verify accordance therebetween, and transmits an authentication result according to the verifications to the computer terminal device.

The authentication code generation process may include: an online authentication code generation process in which the authentication server device generates the online authentication code (Ocode); and a mobile authentication code generation process in which the authentication server device generates the mobile authentication code (Mcode).

The authentication code provision process may include: an online authentication code provision process in which the authentication server device provides the online authentication code (Ocode) generated during the authentication code generation process to the computer terminal device; and a mobile authentication code provision process in which the authentication server device provides the mobile authentication code (Mcode) generated during the authentication code generation process to the portable terminal device.

The authentication code display process may include: an online authentication code display process in which the computer terminal device displays the online authentication code (Ocode) received from the authentication server device on the screen of the computer terminal device; and a mobile authentication code display process in which the portable terminal device displays the mobile authentication code (Mcode) received from the authentication server device to the screen of the portable terminal device.

The authentication code cross-transmission process may include: an online authentication code transmission process in which the portable terminal device receives the online authentication code (Ocode) displayed on the computer terminal device and transmits the online authentication code (Ocode) to the authentication server device; and a mobile authentication code transmission process in which the computer terminal device receives the mobile authentication code (Mcode) displayed on the portable terminal device and transmits the mobile authentication code (Mcode) to the authentication server device.

The authentication verification process may include: a portable terminal device number obtainment process which detects and obtains the portable terminal device number (Dev_no) when the online authentication code (Ocode*) is received from the portable terminal device; a verification performance process which compares the obtained online authentication code (Ocode*) with the online authentication code (Ocode) generated by the authentication request and the obtained mobile authentication code (Mcode*) with the mobile authentication code (Mcode) generated by the authentication request to verify accordance therebetween and compares the obtained portable terminal device number (Dev_no) with the portable terminal device identification information (Tel_no) input from the computer terminal device to verify accordance therebetween; and an authentication result notification process which transmits an authentication result according to the verification to the computer terminal device.

Since authentication is performed by generating an online authentication code (Ocode) and a mobile authentication code (Mcode) in an authentication server device, providing the online authentication code (Ocode) to a user's computer terminal device, providing the mobile authentication code (Mcode) to a user's portable terminal device, inputting the online authentication code (Ocode) received by the user's computer terminal device into the user's portable terminal device to be transmitted to the authentication server device, and inputting the mobile authentication code (Mcode) received by the user's portable terminal device into the user's computer terminal device to be transmitted to the authentication server device, the present invention is advantageous for maintaining two times of mutual security and preventing authentication code theft by a third person because portable terminal authentication using user's portable terminal device identification information (Tel_no) is performed even when an authentication code is leaked or stolen.

In addition, since an online authentication code (Ocode) and a mobile authentication code (Mcode) according to the present invention are generated as one-time random authentication codes, security can be improved because the online authentication code (Ocode) and the mobile authentication code (Mcode) are deleted when the online authentication code (Ocode) and the mobile authentication code (Mcode) are unused within a predetermined period from a generated time point thereof.

In addition, the present invention does not depend on a separate hardware module such as a hardware security token, a universal subscriber identity module (USIM), and a micro SD by performing authentication only using an online authentication code (Ocode) and a mobile authentication code (Mcode), and is advantageous for improving usability because the present invention can be applied to both a smart device and a general mobile phone using a mobile communication message and a push message that use a method of transmitting and receiving a message including an authentication code between an authentication server device and a user's portable terminal device.

In addition, since the present invention includes various services configured to need online authentication and can thus be equally applied to various cases such as login, member registration, payment settlement, an account transfer, e-commerce, etc., the present invention is advantageous for having a safe and convenient authentication method.

BRIEF DESCRIPTION OF THE FIGURES

FIGS. 10A-10C are illustrations of devices displaying Ocode in accordance with embodiments.

FIGS. 11A-11D are illustrations of devices displaying Mcode in accordance with embodiments.

DETAILED DESCRIPTION

Figure 1:
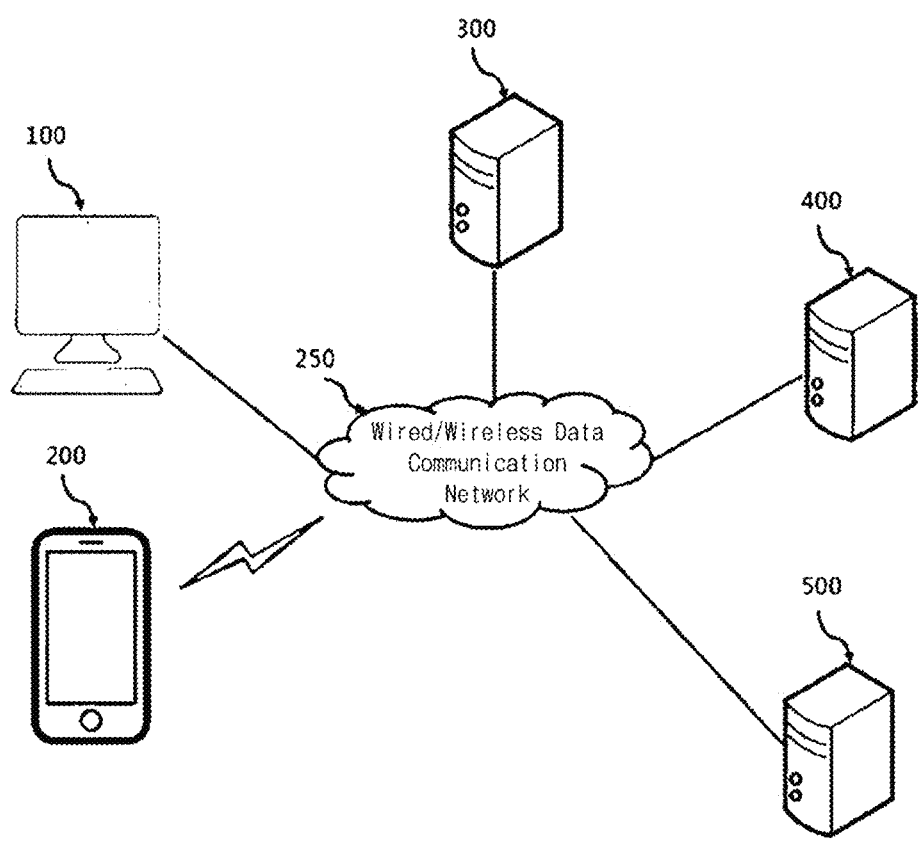
FIG. 1 is a schematic view illustrating a configuration of a mobile cross-authentication system according to the present invention.

Hereinafter, a configuration and operation of a mobile cross-authentication system according to the present invention and an authentication method of the system will be described with reference to the accompanying drawings.

Technical Improvements & Practical Applications of Embodiments

Once a user requests an authentication by using a computer terminal, an authentication server device generates two different codes, which are an online authentication code ("Ocode") and a mobile authentication code ("Mcode"). The authentication server device transmits the Ocode to the computer terminal device, and transmits the Mcode to the portable terminal device.

In generating the Ocode and the Mcode, one-time temporal random code generation scheme can be used by the authentication server device. For example, random code generation scheme can be truly random hardware random-number generators (HRNGS), which generate random numbers as a function of current value of some physical environment attribute that is constantly changing in a manner that is practically impossible to model, or pseudorandom number generators (PRNGS), which generate numbers that look random, but are actually deterministic, and can be reproduced if the state of the PRNG is known. The pseudorandom number generator (PRNG), also known as a deterministic random bit generator (DRBG) is an algorithm for generating a sequence of numbers whose properties approximate the properties of sequences of random numbers, can be used by a computing device described in the present disclosure. PRNGs are central in applications such as simulations (e.g., for the Monte Carlo method), electronic games (e.g., for procedural generation), and cryptography. Cryptographic applications require the output not to be predictable from earlier outputs, and more elaborate algorithms, which do not inherit the linearity of simpler PRNGs, are needed.

The present disclosure primarily has three aspects for improving the cyber security technologies related to transactions using the portable terminal device.

First, for one authentication, two different codes (i.e., the Ocode and the Mcode) are generated and transmitted to two different devices (the computer terminal device and the portable terminal device), and then, the code sent to the computer terminal device is transmitted to the portable terminal device, and the code sent to the portable terminal device is transmitted to the computer terminal device, and then, those code are cross-authenticated.

In this aspect, even one code is leaked, the authentication cannot be succeeded. Even one device is stolen, the authentication cannot be succeeded. Even two codes are leaked, the two devices (the computer terminal device and the portable terminal device) are not stolen, the authentication cannot be succeeded. Thus, the cyber security technologies can be improved by this aspect.

Second, portable terminal device identification information is requested in requesting an authentication. In conventional art, the portable terminal device identification information is stored in the user information database. However, in conventional art, when the portable terminal device is changed, the user information database must be updated to re-register the stored portable terminal device identification information. By contract, in the present disclosure, portable terminal device identification information is requested in requesting an authentication. Thus, it is more convenient to a user and it can save time and resource. Thus, the cyber security technologies can be improved by this aspect.

Third, three-stage authentications are required—i) Ocode authentication; ii) Mcode authentication; iii) portable terminal device identification information authentication. The cyber security technologies can further be improved by this aspect.

It can be seen from the previous description that, when completing the payment service by using the three-stage authentications in the present application, A user may use Ocode and Mcode temporarily generated by the devices instead of the user's personal information (e.g., real card number). Even if an unauthorized person steals the user's smartphone, the unauthorized person cannot complete the payment operation because two different codes (i.e., the Ocode and the Mcode) cannot be matched, thereby ensuring property security of the user. In addition, because the three-stage authentications in the present application does not need to carry the user's real card number printed on an actual credit card or real ID (e.g., Social Security Number), a payment operation can be performed and improve user experience and flexibility of the described implementation of services.

Implementation of the present application provide methods and apparatuses for implementing services, such as making a payment by using a one-time generated code.

In some embodiments, the portable terminal device identification information is used (i) for transmitting the Mcode to the portable terminal device to perform cross-authentication through two different devices; (ii) for verifying a user by retrieving an authentication code generated by the authentication server device when a code is verified (the authentication server device may store generated codes along with mapping information with terminal devices); and (iii) for verifying matching of a portable terminal device number (Dev_no) with the received telephone number of the portable terminal device identification information.

Dev_no can be various types of information that uniquely identifies each portable terminal device such as, a telephone number, device serial number, IMEI (International Mobile Equipment Identity), and MEID (Mobile Equipment Identifier).

When the Ocode is transmitted using a SMS message, the authentication server device can obtain the sender's telephone number from SMS, but cannot obtain other information such as device serial number, IMEI (International Mobile Equipment Identity), and MEID (Mobile Equipment Identifier). In this case, it can be configured to retrieve other information such as device serial number, IMEI (International Mobile Equipment Identity), and MEID (Mobile Equipment Identifier) from the database of the authentication server device.

When the Ocode is transmitted through the mobile app, the information such as a telephone number, device serial number, IMEI (International Mobile Equipment Identity), and MEID (Mobile Equipment Identifier) can be obtained.

In the present disclosure, the portable terminal device identification information (Tel_no) is information entered by a user input, and the portable terminal device number (Dev_no) is information detected and obtained when the Ocode is received from the portable terminal device or information stored in a database of the authentication server device and automatically retrieved. If the portable terminal device number (Dev_no) is not matched with the received portable terminal device identification information, an authentication would be failed.

When Ocode is received by the portable terminal device, and the portable terminal device transmits the Ocode to the authentication server device, the authentication server device can detect and obtain the portable terminal device number (Dev_no) when the authentication server receives the Ocode or the authentication server device can acquire Dev_no from the database of the authentication server. The authentication server device may verify whether Dev_no is matched with the portable terminal device identification information received from the user.

FIG. 1 is a schematic view illustrating a configuration of a mobile cross-authentication system according to the present invention.

Referring to FIG. 1, a mobile cross authentication system according to the present invention may include a user's computer terminal device 100, a user's portable terminal device 200, and an authentication server device 300 and may further include a payment gateway (PG) server device 400 and a service server device 500.

The computer terminal device 100, the portable terminal device 200, the authentication server device 300, the PG server device 400, and the service server device 500 are connected through a wired/wireless data communication network 250 to perform data communication.

The wired/wireless data communication network 250 is a communication network including a mobile communication network capable of performing data communication including a 2nd generation (2G), a 3rd generation (3G), a 4th generation (4G), or the like and an Internet network in which a wireless fidelity (Wi-Fi) network, a wide area network (WAN), a local area network (LAN), etc. are combined with each other.

The computer terminal device 100 may be a notebook computer, a personal computer (PC), a desktop computer, a tablet PC, or the like or may be a smart device such as a smart phone, a smart pad, etc. When the computer terminal device 100 is a smart device such as a smart phone or a smart pad, the computer terminal device 100 may be a portable terminal device 200. That is, when a user requests performing authentication through the smart device, one terminal may be used for either the computer terminal device 100 or the portable terminal device 200.

A computer terminal device 100 according to a first embodiment of the present invention transmits a signal of an authentication request through the wired/wireless data communication network 250 to the authentication server device 300, receives a request of user's portable terminal device identification information from the authentication server device, transmits user's portable terminal device identification information Tel_no to the authentication server device, displays an online authentication code Ocode generated by the authentication server device 300 on the computer terminal device 100, receives a mobile authentication code Mcode displayed on the portable terminal device 200, transmits the mobile authentication code Mcode to the authentication server device 300, performs verification in the authentication server device 300, receives an authentication result according to the verification, and displays the authentication result thereon.

When an arbitrary service configured to need online authentication is used, the authentication system may be configured so that the computer terminal device 100 directly requests authentication to the authentication server device 300, may be configured to further include a PG server device 400 so that authentication is requested to the authentication server device 300 through the PG server device 400 when the computer terminal device 100 requests payment to the PG server device 400, and may be configured to further include a service server device 500 so that authentication is requested to the authentication server device through the service server device 500 when the computer terminal device 100 requests performing a service to the service server device 500.

The portable terminal device 200 is a terminal having inherent identification information (portable terminal device identification information and portable terminal device number such as telephone numbers, International Mobile Equipment Identity (IMEI), Mobile Equipment IDentifer (MEID), etc.), and may be a device such as a general portable phone, a smart phone, a smart pad, etc., is connected to the wired/wireless data communication network 250, and transmits or receives a message including an authentication code to or from the authentication server device 300.

The portable terminal device 200 receives the mobile authentication code Mcode generated in the authentication server device 300 by the authentication request and displays the mobile authentication code Mcode on a screen of the portable terminal device 200, receives the online authentication code Ocode displayed on the computer terminal device 100, transmits the online authentication code Ocode to the authentication server device 300, receives an authentication result from the authentication server device 300, and displays the authentication result thereon.

The portable terminal device 200 receives a message including the mobile authentication code Mcode generated by the authentication server device 300, receives the online authentication code Ocode displayed on the computer terminal device 100, forms a message, and transmits the formed message to the authentication server device 300, and the formed message may be configured as one of mobile communication messages, such as a short message service (SMS) message, a long message service (LMS) message, a multimedia message service (MMS) message, etc., and smart phone push messages.

After the authentication server device 300 receives the signal of the authentication request from the computer terminal device 100, the authentication server device 300 requests user's portable terminal device identification information to the computer terminal device 100, receives user's portable terminal device identification information Tel_no input by the computer terminal device 100 in response to the request, generates an online authentication code Ocode and a mobile authentication code Mcode, provides the online authentication code Ocode to the computer terminal device 100, provides the mobile authentication code Mcode to the portable terminal device 200, obtains a mobile authentication code Mcode* received from the computer terminal device 100, obtains an online authentication code Ocode* received from the portable terminal device 200, obtains portable terminal device number Dev_no when the online authentication code Ocode* is received, compares the obtained online authentication code Ocode* with the online authentication code Ocode generated by the authentication request and the obtained mobile authentication code Mcode* with the mobile authentication code Mcode generated by the authentication request to verify accordance therebetween, compares the obtained portable terminal device number Dev_no with the portable terminal device identification information Tel_no input from the computer terminal device 100 to verify accordance therebetween, and transmits an authentication result according to the verifications to the computer terminal device 100.

The PG server device 400 may be a payment gateway server device or a value added network (VAN) system server device and, when a payment settlement service configured to need authentication in the user's computer terminal device 100 is performed, requests the authentication to the authentication server device through a wired/wireless data communication network 250. When the authentication succeeds, a payment settlement process is performed, and a result thereof is provided to the computer terminal device 100.

The service server device 500 may be an information provision server device configured to provide information, a financial server device configured to provide an Internet banking service such as an account transfer, etc., or a web server device of an online shopping-mall web site and, when a service configured to need authentication in the user's computer terminal device 100 is performed, requests the authentication to the authentication server device 300. When the authentication succeeds, a corresponding service is provided to the computer terminal device 100.

Here, A* refers to information of a case in which information A (e.g., an online authentication code and a mobile authentication code) is transmitted and provided from an authentication server device to one device, input back from the other device.

Figure 2:
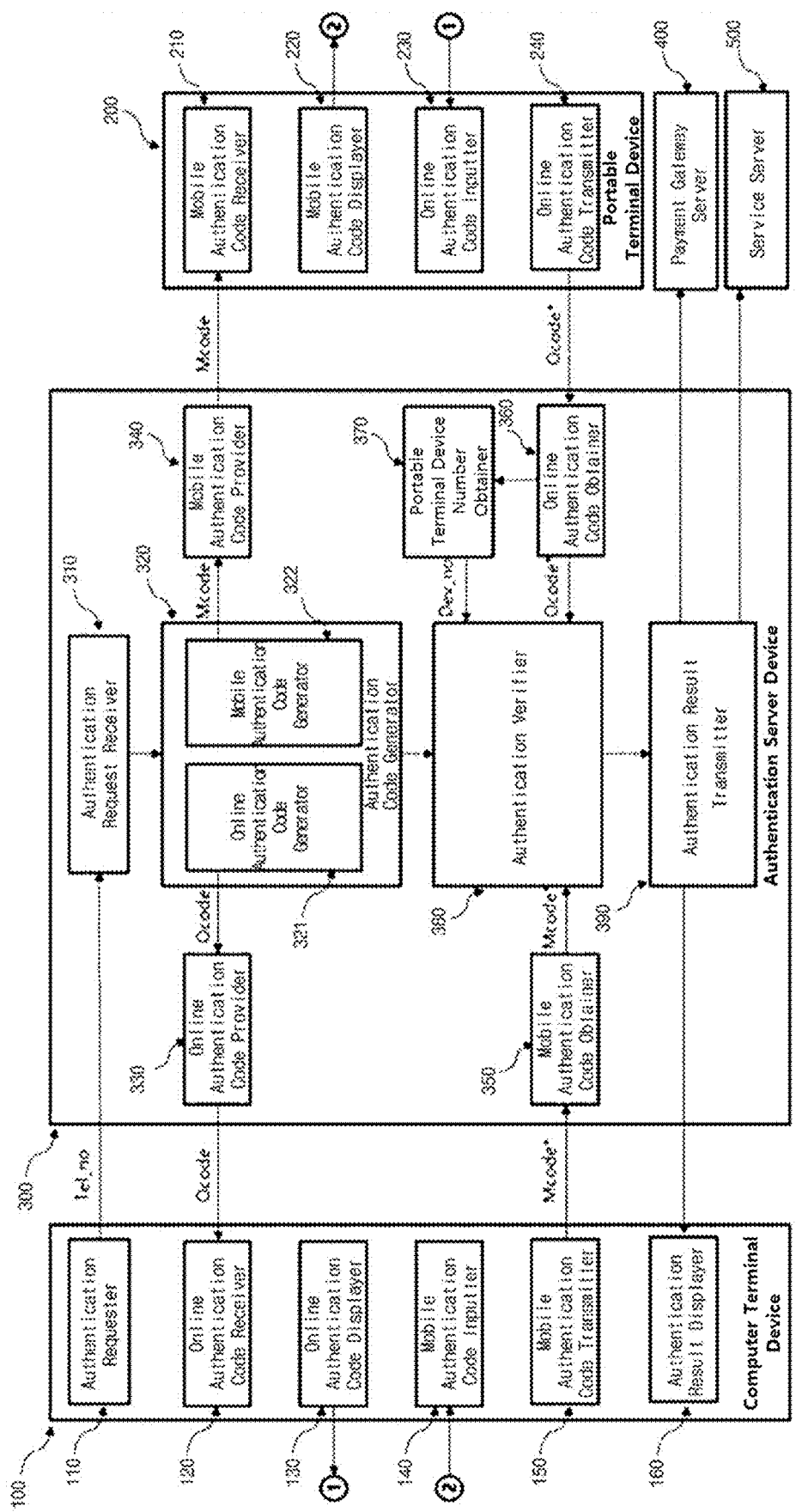
FIG. 2 is a view illustrating a detailed configuration of the mobile cross-authentication system according to the present invention.

FIG. 2 is a view illustrating a detailed configuration of the mobile cross-authentication system according to the present invention. Hereinafter, a detailed configuration and operation of the mobile cross-authentication system will be described with reference to FIG. 2.

A configuration and operation of the computer terminal device 100 will be described in detail. The computer terminal device 100 includes an authentication requester 110, an online authentication code receiver 120, an online authentication code displayer 130, a mobile authentication code inputter 140, a mobile authentication code transmitter 150, and an authentication result displayer 160.

When an arbitrary service configured to need online authentication is used, the authentication requester 110 transmits a signal of an authentication request to the authentication server device 300, receives a request of portable terminal device identification information from the authentication server device 300, and transmits user's portable terminal device identification information Tel_no to the authentication server device 300.

The online authentication code receiver 120 receives an online authentication code Ocode generated by the authentication server device 300, and the online authentication code displayer 130 displays the online authentication code Ocode received from the authentication server device 300 on a screen of the computer terminal device 100.

The mobile authentication code inputter 140 inputs a mobile authentication code Mcode, which is generated by the authentication server device 300 and transmitted to the portable terminal device 200, into the computer terminal device 100, and the mobile authentication code transmitter 150 transmits the input mobile authentication code Mcode to the authentication server device 300.

The authentication result displayer 160 performs verification in the authentication server device 300, receives an authentication result according to the verification, and displays the authentication result thereon.

A configuration and operation of the portable terminal device 200 will be described in detail. The portable terminal device 200 includes a mobile authentication code receiver 210, a mobile authentication code displayer 220, an online authentication code inputter 230, and an online authentication code transmitter 240.

The mobile authentication code receiver 210 receives the mobile authentication code Mcode generated by the authentication server device 300, and the mobile authentication code displayer 220 displays the mobile authentication code Mcode received from the authentication server device 300 on a screen of the portable terminal device 200.

The online authentication code inputter 230 inputs the online authentication code Ocode, which is generated by the authentication server device 300 and transmitted to the computer terminal device 100, into the portable terminal device 200, and the online authentication code transmitter 240 transmits the input online authentication code Ocode to the authentication server device 300.

A configuration and operation of the authentication server device 300 will be described in detail. The authentication server device 300 includes an authentication request receiver 310, an authentication code generator 320, an online authentication code provider 330, a mobile authentication code provider 340, a mobile authentication code obtainer 350, an online authentication code obtainer 360, a portable terminal device number obtainer 370, an authentication verifier 380, and an authentication result transmitter 390.

The authentication request receiver 310 receives a signal of an authentication request from the computer terminal device 100, requests user's portable terminal device identification information to the computer terminal device 100, and receives user's portable terminal device identification information Tel_no from the computer terminal device 100.

The authentication code generator 320 generates the online authentication code Ocode and the mobile authentication code Mcode by the authentication request and the authentication code generator 320 may further include an online authentication code generator 321 and a mobile authentication code generator 322, wherein the online authentication code generator 321 generates the online authentication code Ocode by the authentication request and mobile authentication code generator 322 generates the mobile authentication code Mcode by the authentication request.

The online authentication code provider 330 provides the online authentication code Ocode generated by the authentication code generator to the computer terminal device 100, and the mobile authentication code provider 340 provides the mobile authentication code Mcode generated by the authentication code generator to the portable terminal device 200.

The mobile authentication code obtainer 350 obtains the mobile authentication code Mcode* received from the computer terminal device 100, the online authentication code obtainer 360 obtains the online authentication code Ocode* received from the portable terminal device 200, and the portable terminal device number obtainer 370 detects and obtains the portable terminal device number Dev_no when the online authentication code Ocode* is received from the portable terminal device.

The authentication verifier 380 compares the obtained online authentication code Ocode* with the online authentication code Ocode generated by the authentication code generator 320 and the obtained mobile authentication code Mcode* with the mobile authentication code Mcode generated by the authentication code generator 320 to verify accordance therebetween, and compares the obtained portable terminal device number Dev_no with the portable terminal device identification information Tel_no received by the authentication request receiver 310 from the computer terminal device to verify accordance therebetween. An authentication result according to the verifications is determined as authentication success when all the verifications succeed and is determined as authentication fail even when one of the verifications fails.

The authentication result transmitter 390 transmits the authentication result according to the verifications from the authentication verifier 380 to the computer terminal device 100.

A configuration of an authentication system according to a second embodiment of the present invention further includes a PG server device 400 when a service configured to need payment settlement authentication is used, the computer terminal device 100 requests payment settlement to the PG server device 400, and authentication is requested to the authentication request receiver 310 of the authentication server device 300 through the PG server device 400. In addition, the authentication server device performs verification and transmits an authentication result to the PG server device 400.

When services for login, an account transfer, and an online shopping mall are used, a configuration of an authentication system according to a third embodiment of the present invention includes a service server device 500 configured to provide corresponding services, the computer terminal device 100 requests performing a service to the service server device 500, and authentication is requested to the authentication request receiver 310 of the authentication server device 300 through the service server device 500. In addition, the authentication server device performs verification, and an authentication result of the verification is transmitted to the service server device 500.

Figure 3:
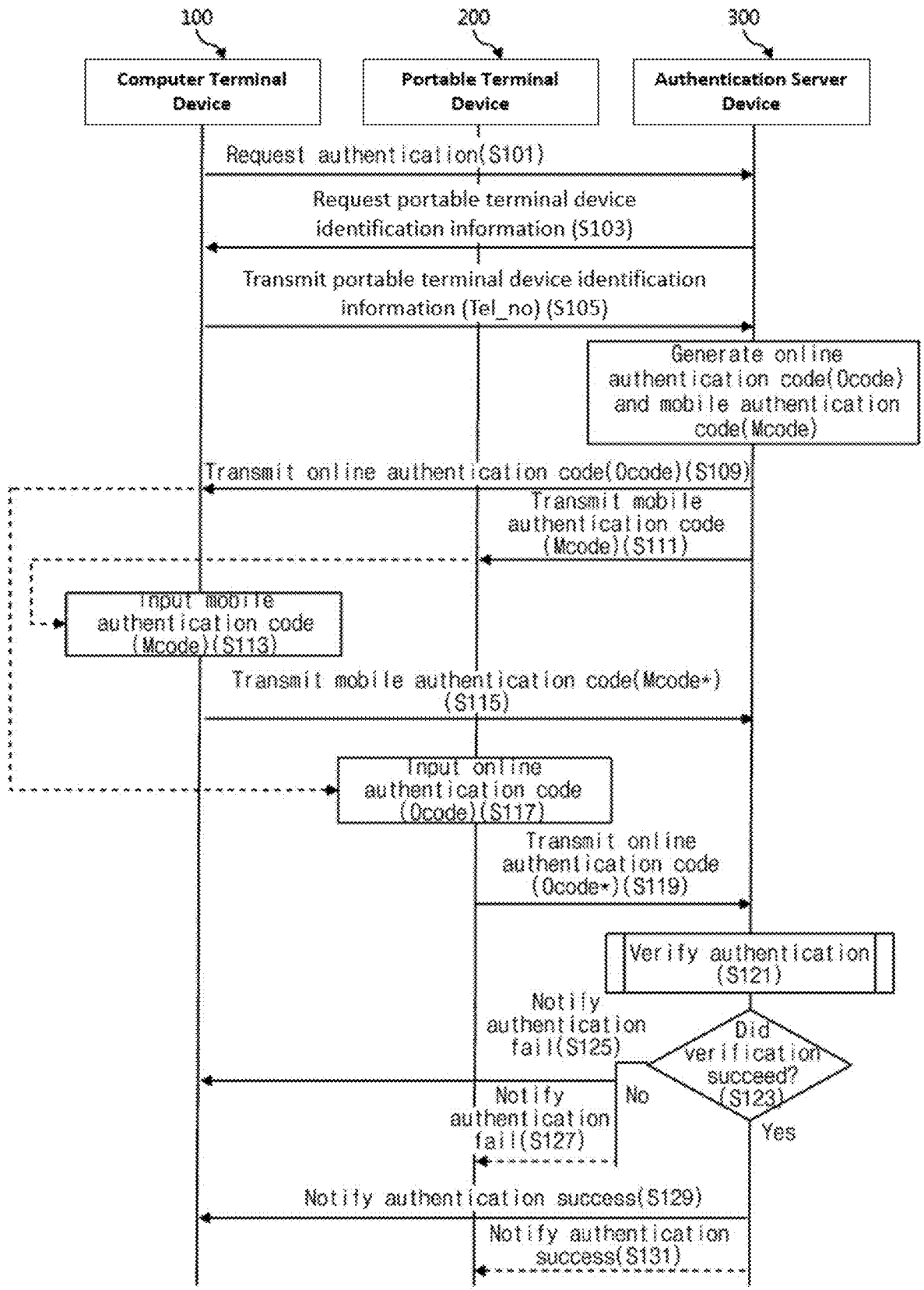
FIG. 3 is a procedure flowchart illustrating a mobile cross-authentication method according to a first embodiment of the present invention.

FIG. 3 is a procedure flowchart illustrating a mobile cross-authentication method according to a first embodiment of the present invention.

Referring to FIG. 3, when an arbitrary service configured to need online authentication is used, the computer terminal device 100 transmits a signal of an authentication request to the authentication server device 300 to request authentication (S101).

The authentication server device 300 receives the signal of the authentication request from the computer terminal device 100 and requests user's portable terminal device identification information to the computer terminal device 100 (S103).

The computer terminal device 100 transmits user's portable terminal device identification information Tel_no by the request of the portable terminal device identification information to the authentication server device 300 (S105).

The authentication server device 300 generates an online authentication code Ocode and a mobile authentication code Mcode (S107).

The authentication server device 300 transmits the generated online authentication code Ocode to the computer terminal device 100 (S109).

The authentication server device 300 transmits the generated mobile authentication code Mcode to the portable terminal device 200 (S111).

The computer terminal device 100 inputs the mobile authentication code Mcode displayed on the portable terminal device 200 into the computer terminal device 100 (S113) and transmits the input mobile authentication code Mcode to the authentication server device 300 (S115).

The portable terminal device 200 inputs the online authentication code Ocode displayed on the computer terminal device 100 into the portable terminal device 200 (S117) and transmits the input online authentication code Ocode* to the authentication server device 300 (S119).

The authentication server device 300 compares the generated online authentication code Ocode with the online authentication code Ocode* received from the portable terminal device 200 to verify accordance therebetween, compares the generated mobile authentication code Mcode with the mobile authentication code Mcode* received from the computer terminal device 100 to verify accordance therebetween, and compares the portable terminal device identification information Tel_no input from the computer terminal device 100 with portable terminal device number Dev_no detected and obtained when the online authentication code Ocode* is received to verify accordance therebetween (S121).

When all the three verifications succeed, the authentication server device 300 determines an authentication result according to the verifications as authentication success and determines the authentication result as authentication fail even when one of the three verifications fails (S123).

When the authentication result according to the verifications is authentication fail, the authentication server device 300 notifies the computer terminal device 100 of the authentication fail (S125). At this time, the authentication server device 300 may also notify the portable terminal device 200 of the authentication fail (S127).

When the authentication result according to the verifications is authentication success, the authentication server device 300 notifies the computer terminal device 100 of the authentication success (S129). At this time, the authentication server device 300 may also notify the portable terminal device 200 of the authentication success (S131).

Figure 4:
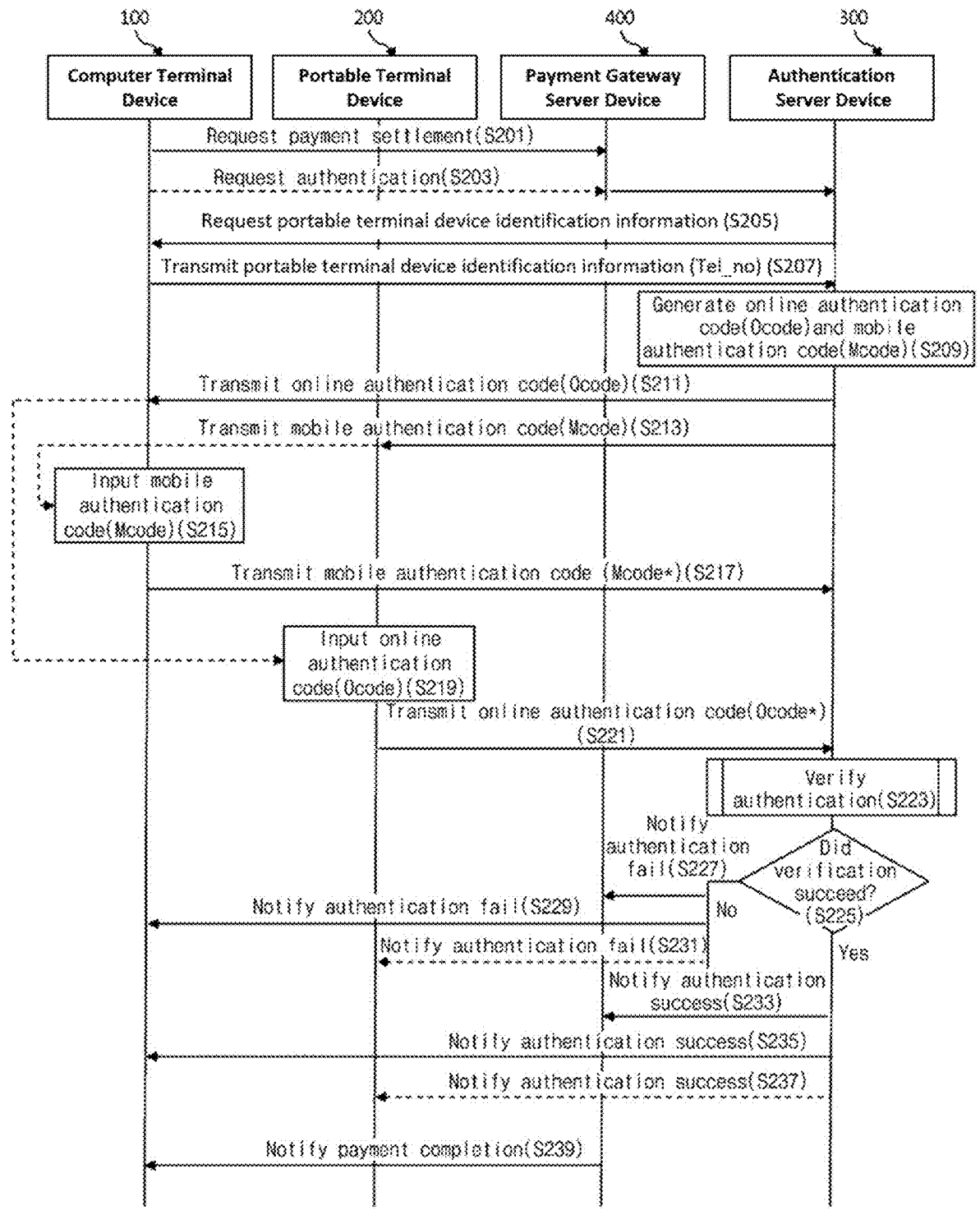
FIG. 4 is a procedure flowchart illustrating a mobile cross-authentication method according to a second embodiment of the present invention.

FIG. 4 is a procedure flowchart illustrating a mobile cross-authentication method according to second embodiment of the present invention.

Referring to FIG. 4, when an arbitrary service configured to need online payment settlement is used, the computer terminal device 100 transmits a signal of a payment settlement request to the PG server device 400 (S201) and requests authentication by transmitting a signal of an authentication request to the authentication server device 300 through the PG server device 400 (S203).

The authentication server device 300 receives the signal of the authentication request from the computer terminal device 100 through the PG server device 400 and requests user's portable terminal device identification information to the computer terminal device 100 (S205).

The computer terminal device 100 transmits user's portable terminal device identification information Tel_no to the authentication server device 300 by the request of the portable terminal device identification information (S207).

The authentication server device 300 generates an online authentication code Ocode and a mobile authentication code Mcode (S209).

The authentication server device 300 transmits the generated online authentication code Ocode to the computer terminal device 100 (S211).

The authentication server device 300 transmits the generated mobile authentication code Mcode to the portable terminal device 200 (S213).

The computer terminal device 100 inputs the mobile authentication code Mcode displayed on the portable terminal device 200 into the computer terminal device 100 (S215) and transmits the input mobile authentication code Mcode* to the authentication server device 300 (S217).

The portable terminal device 200 inputs the online authentication code Ocode displayed on the computer terminal device 100 into the portable terminal device 200 (S219) and transmits the input online authentication code Ocode* to the authentication server device 300 (S221).

The authentication server device 300 compares the generated online authentication code Ocode with the online authentication code Ocode* received from the portable terminal device 200 to verify accordance therebetween, compares the generated mobile authentication code Mcode with the mobile authentication code Mcode* received from the computer terminal device 100 to verify accordance therebetween, and compares the portable terminal device identification information Tel_no input from the computer terminal device 100 with the portable terminal device number Dev_no detected and obtained when the online authentication code Ocode* is received to verify accordance therebetween (S223).

The authentication server device 300 determines an authentication result according to the verifications as authentication success when all the three verifications succeed and determines the authentication result as authentication fail even when one of the three verifications fails (S225).

When the authentication result according to the verifications is authentication fail, the authentication server device 300 notifies the PG server device 400 of the authentication fail (S227) and also notifies the computer terminal device 100 of the authentication fail (S229). At this time, the authentication server device 300 may also notify the portable terminal device 200 of the authentication fail (S231).

When the authentication result according to the verifications is authentication success, the authentication server device 300 notifies the PG server device 400 of the authentication success (S233) and also notifies the computer terminal device 100 of the authentication success (S235). At this tithe, the authentication server device 300 may also notify the portable terminal device 200 of the authentication success (S237).

When the authentication result according to the verifications is the authentication success, the PG server device 400 performs payment settlement and notifies the computer terminal device 100 of completion of the payment settlement (S239).

Figure 5:
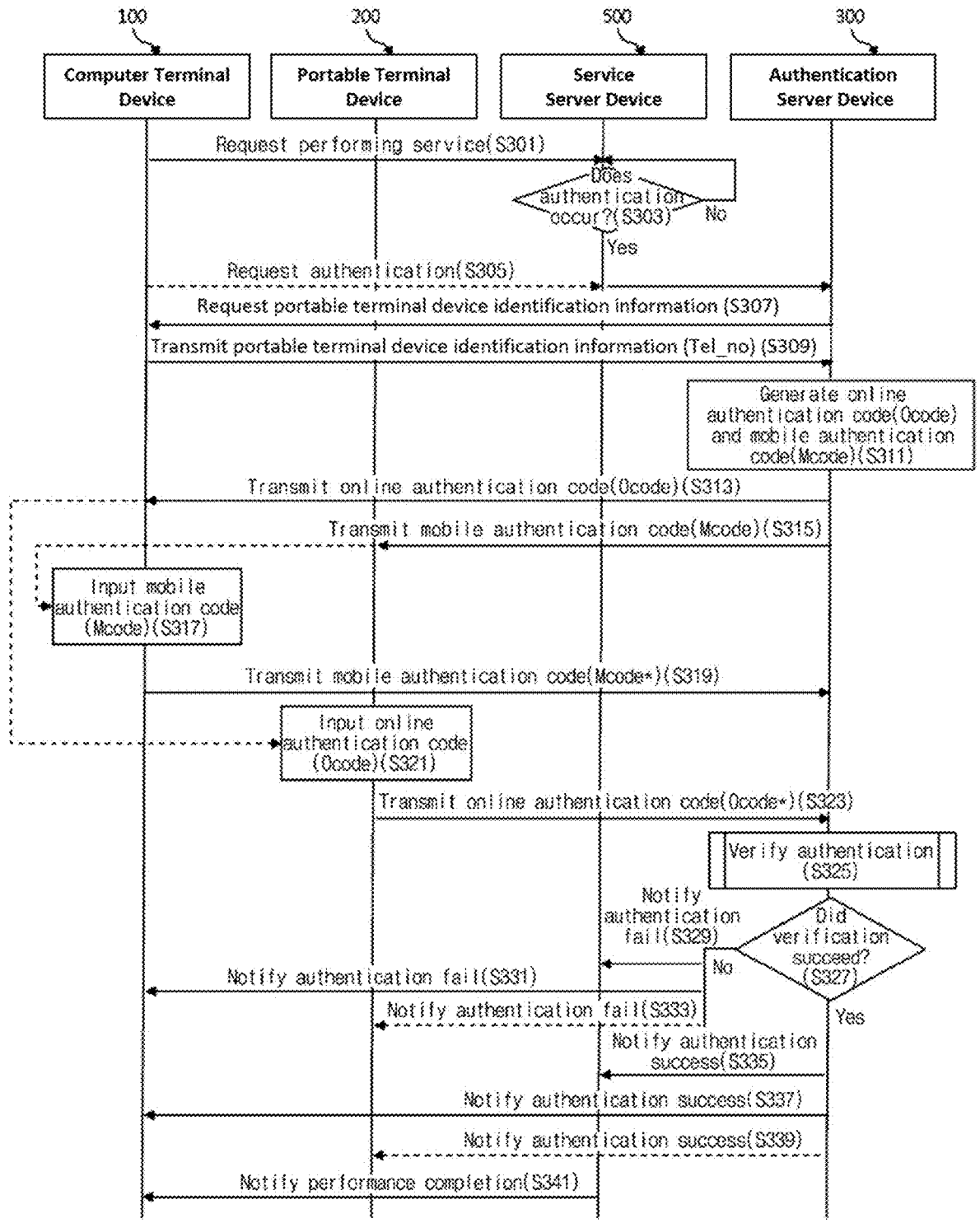
FIG. 5 is a procedure flowchart illustrating a mobile cross-authentication method according to a third embodiment of the present invention.

FIG. 5 is a procedure flowchart illustrating a mobile cross-authentication method according to a third embodiment of the present invention.

Referring to FIG. 5, when services for login, an account transfer, and an online shopping mall are used, the computer terminal device 100 requests performing a service to the service server device 500 (S301).

The service server device 500 determines whether the corresponding services need authentication (S303).

When the corresponding services need authentication, the service server device 500 requests the authentication by transmitting a signal of an authentication request from the computer terminal device 100 to the authentication server device 300 through the service server device 500 (S305).

The authentication server device 300 receives the signal of the authentication request from the computer terminal device through the service server device 500 and requests user's portable terminal device identification information to the computer terminal device 100 (S307).

The computer terminal device 100 transmits user's portable terminal device identification information Tel_no to the authentication server device 300 by the request of the portable terminal device identification information (S309).

The authentication server device 300 generates an online authentication code Ocode and a mobile authentication code Mcode (S311).

The authentication server device 300 transmits the generated online authentication code Ocode to the computer terminal device 100 (S313).

The authentication server device 300 transmits the generated mobile authentication code Mcode to the portable terminal device 200 (S315).

The computer terminal device 100 inputs the mobile authentication code Mcode displayed on the portable terminal device 200 into the computer terminal device 100 (S317) and transmits the input mobile authentication code Mcode* to the authentication server device 300 (S319).

The portable terminal device 200 inputs the online authentication code Ocode displayed on the computer terminal device 100 into the portable terminal device 200 (S321) and transmits the input online authentication code Ocode* to the authentication server device 300 (S323).

The authentication server device 300 compares the generated online authentication code Ocode with the online authentication code Ocode* received from the portable terminal device 200 to verify accordance therebetween, compares the generated mobile authentication code Mcode with the mobile authentication code Mcode* received from the computer terminal device 100 to verify accordance therebetween, and compares the portable terminal device identification information Tel_no input from the computer terminal device 100 with the portable terminal device number Dev_no detected and obtained when the online authentication code Ocode* is received to verify accordance therebetween (S325).

The authentication server device 300 determines an authentication result according to the verification as authentication success when all the three verifications succeed and determines the authentication result as authentication fail even when one of the three verifications fails (S327).

When the authentication result according to the verifications is authentication fail, the authentication server device 300 notifies the service server device 500 of the authentication fail (S329) and also notifies the computer terminal device 100 of the authentication fail (S331). At this time, the authentication server device 300 may also notify the portable terminal device 200 of the authentication fail (S333).

When the authentication result according to the verifications is authentication success, the authentication server device 300 notifies the service server device 500 of the authentication success (S335) and also notifies the computer terminal device 100 of the authentication success (S337). At this time, the authentication server device 300 may also notify the portable terminal device 200 of the authentication success (S339).

When the authentication result according to the verifications is the authentication success, the service server device 500 performs a corresponding service and notifies the computer terminal device 100 of performance completion of the corresponding service (S341).

Figure 6:
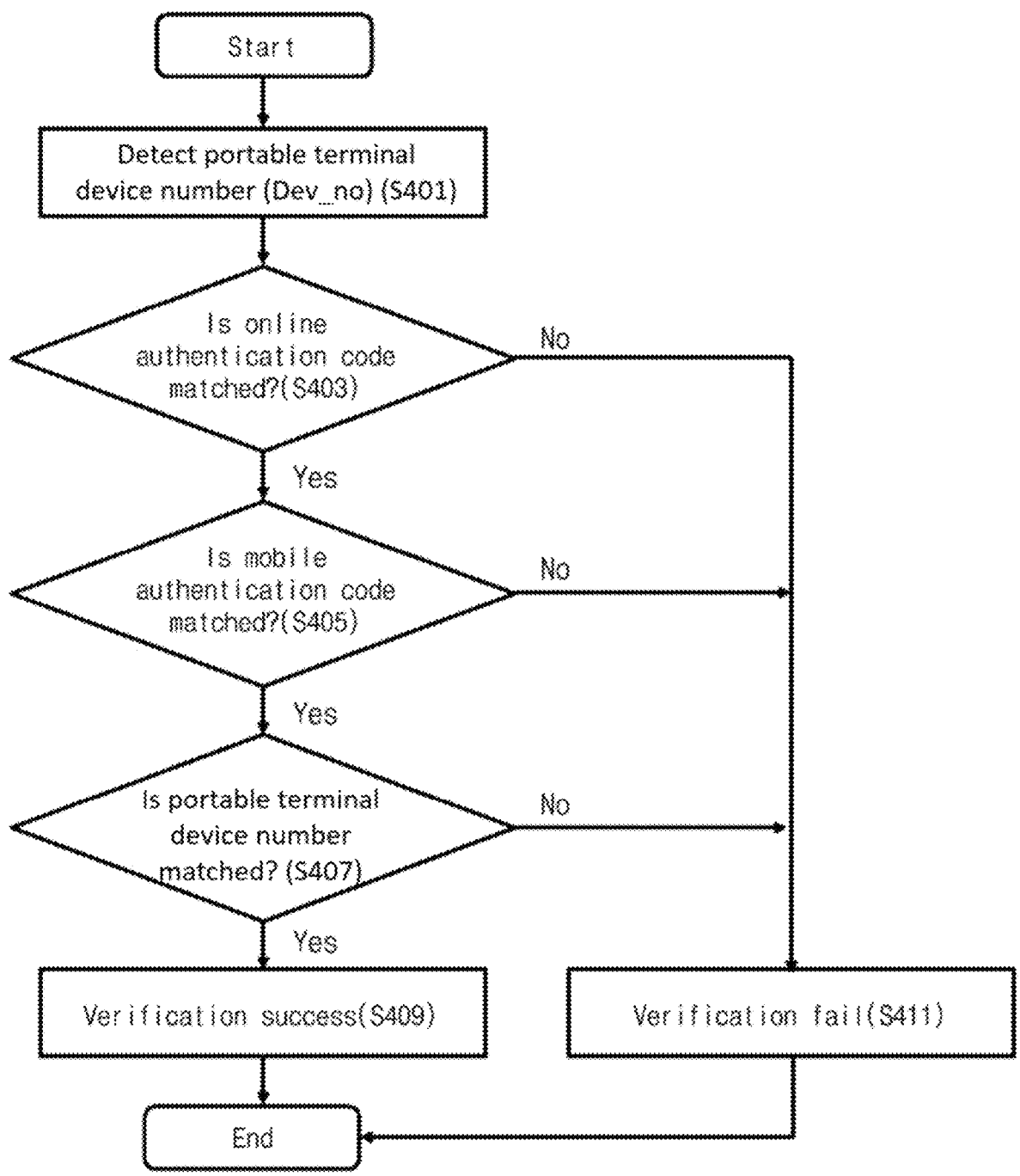
FIG. 6 is a flowchart illustrating an authentication verification method in an authentication server device to which the mobile cross-authentication method according to the present invention is applied.

FIG. 6 is a flowchart illustrating an authentication verification method in an authentication server device to which the mobile cross-authentication method according to the present invention is applied.

Referring to FIG. 6, when an online authentication code Ocode* is received from the online authentication code obtainer 360, the portable terminal device number obtainer 370 obtains portable terminal device number Dev_no (S401).

When the portable terminal device number Dev_no is obtained, the authentication verifier 380 compares the online authentication code Ocode* obtained from the online authentication code obtainer 360 with an online authentication code Ocode generated by the authentication code generator 320 to verify accordance therebetween (S403).

When the verification succeeds, the authentication verifier 380 compares a mobile authentication code Mcode* obtained from the mobile authentication code obtainer 350 with a mobile authentication code Mcode generated by the authentication code generator 320 to verify accordance therebetween (S405).

When the verification succeeds, the authentication verifier 380 compares portable terminal device number Dev_no obtained from the portable terminal device number obtainer 370 with portable terminal device identification information Tel_no received by the authentication request receiver 310 to verify accordance therebetween (S407).

The authentication verifier 380 determines authentication as verification success when all the three verifications succeed (S409) and determines the authentication as verification fail even when one of the three verifications fails (S411).

Figure 7:
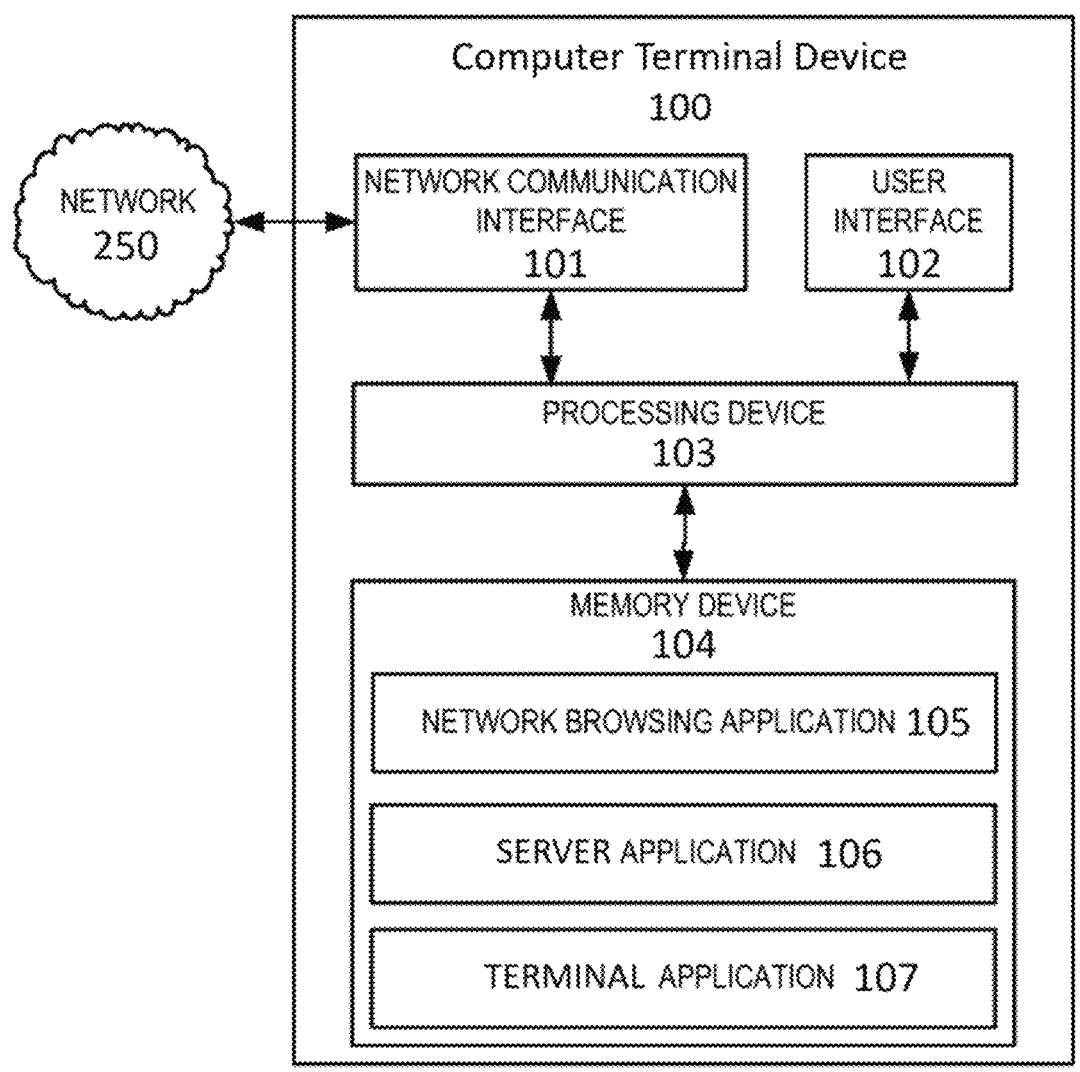
FIG. 7 is a schematic diagram of illustrative circuitry in a computer terminal device in accordance with an embodiment.

FIG. 7 is a schematic diagram of illustrative circuitry in a computer terminal device in accordance with an embodiment.

Referring to FIG. 7, the computer terminal device 100 includes various features, such as a network communication interface 101, a processing device 103, a user interface 102, and a memory device 104. The network communication interface 101 includes a device that allows the computer terminal device 100 to communicate over the network 250 (shown in FIG. 1). In one embodiment of the invention, a network browsing application 105 provides for a user to establish network communication with the authentication server device 100 and the portable terminal device 200.

As used herein, a "processor" or "processing device," such as the processing device 103, generally refers to a device or combination of devices having circuitry used for implementing the communication and/or logic functions of a particular system. For example, a processing device 103 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 103 may further include functionality to operate one or more software programs based on computer-executable program code thereof, which may be stored in memory device 104. As the phrase is used herein, a processor or processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" generally includes a plurality of interface devices and/or software that allow a customer to input commands and data to direct the processing device to execute instructions. For example, the user interface 102 presented in FIG. 7 may include a graphical user interface (GUI) or an interface to input computer-executable instructions that direct the processing device 103 to carry out specific functions. The user may perform interactions by using one or more options on the interaction machine display without actually having to be physically present at the interaction machine or the dummy interaction machine. The user interface 012 employs certain input and output devices as previously described with reference to FIGS. 1 and 2. These input and output devices may include a display, mouse, keyboard, button, touchpad, touch screen, microphone, speaker, LED, light, joystick, switch, buzzer, bell, and/or other user input/output device for communicating with the authentication server device 100 and the portable terminal device 200.

As used herein, a "memory" or "memory device" generally refers to a device or combination of devices that store one or more forms of computer-readable media for storing data and/or computer-executable program code/instructions. Computer-readable media is defined in greater detail below. For example, in one embodiment, the memory device 104 includes any computer memory that provides an actual or virtual space to temporarily or permanently store data and/or commands provided to the processing device 103 when it carries out its functions described herein. The memory device 104 may include such applications as a network browsing application 105, a server application 106, a terminal application 107 and/or the like. The server application 106 may be used to allow communication with a server, such as the authentication server device 100. The terminal application 107 may be used to allow communication with the portable terminal device 200 to implement one or more actions.

Figure 8:
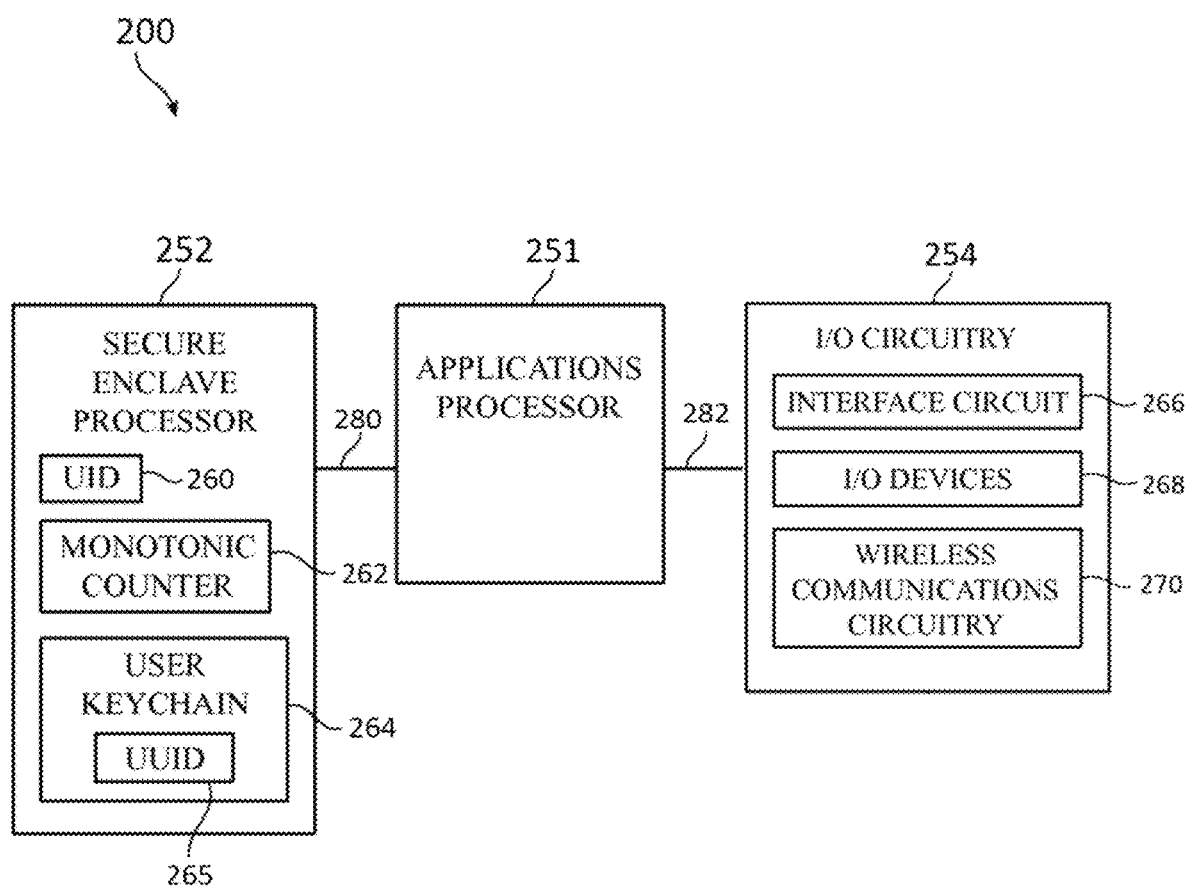
FIG. 8 is a schematic diagram of illustrative circuitry in a portable terminal device in accordance with an embodiment.

A schematic diagram showing illustrative components that may be used in the portable terminal device 200 is shown in FIG. 8. As shown in FIG. 8, the portable terminal device 200 may include control circuitry such as a main processor (sometimes referred to herein as the applications processor or AP) 251, input-output circuitry 254, a secure element such as secure element 256, and a trusted processor such as secure enclave processor (SEP) 252. Applications processor 251 may be used to control the operation of the portable terminal device 200 and may access storage such as hard disk drive storage, nonvolatile memory (e.g., flash memory or other electrically-programmable-read-only memory configured to form a solid state drive), volatile memory (e.g., static or dynamic random-access-memory), etc. This processing circuit may be based on one or more microprocessors, microcontrollers, digital signal processors, application specific integrated circuits, etc.

In general, processor 251 may be used to run software on the portable terminal device 200, such as Internet browsing applications, voice-over-internet-protocol (VOIP) telephone call applications, email applications, media playback applications, operating system functions, secondary device credential management applications, etc.

Applications processor 251 may be coupled to input-output (I/O) circuitry 254 via path 282. Input-output circuitry 254 may include input-output devices 168. Input-output devices 268 may be used to allow data to be supplied to the portable terminal device 200 and to allow data to be provided from the portable terminal device 200 to external devices. Input-output devices 268 may include user interface devices, data port devices, and other input-output components. For example, input-output devices 268 may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 254 may also include wireless communications circuitry 270 for communicating wirelessly with external equipment. Wireless communications circuitry 270 may include processing circuitry (sometimes referred to as baseband processors) that is used in implementing communications protocols to support interactions with external equipment. In one suitable arrangement, each baseband processor may be coupled to one respective transceiver circuit. In other suitable arrangements, a baseband processor may be shared among one or more transceiver circuits. The baseband processing circuitry and the main processor 251 are sometimes referred to collectively as control circuitry.

The baseband processing circuitry may receive digital data to be transmitted from processor 251 and may supply corresponding signals to a wireless transmitter for wireless transmission. During signal reception operations, a wireless receiver may receive radio-frequency signals from external sources (e.g., wireless base stations, wireless access points, GPS satellites, NFC readers, etc.). The baseband processing circuitry may convert signals received from the wireless receiver into corresponding digital data. In general, the functions of the baseband processing circuitry are provided by one or more integrated circuits. Communications protocols that may be implemented using the baseband processing circuitry may include internet protocols, wireless local area network protocols (e.g., IEEE 802.11 protocols—sometimes referred to as Wi-Fi®), protocols for other short-range wireless communications links such as the Bluetooth® protocol, cellular telephone protocols, MIMO protocols, antenna diversity protocols, etc.

For example, circuitry 270 may include wireless local area network transceiver circuitry for handling the 2.4 GHz and 5 GHz bands for Wi-Fi® (IEEE 802.11) communications and the 2.4 GHz Bluetooth® communications band, cellular telephone transceiver circuitry for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples), satellite navigation system circuitry such as global positioning system (GPS) receiver circuitry for receiving GPS signals at 1575 MHz or for handling other satellite positioning data, near-field communications circuitry for producing and receiving near-field communications signals at 13.56 MHz to support communications between the portable terminal device 200 and/or a near-field communications reader or other external near-field communications equipment, and/or other suitable types of wireless transmitters/receivers for supporting long-range wireless links or short-range wireless links. Long-range links are typically used to convey data over thousands of feet or miles. Short-range links are typically used to convey data over tens or hundreds of feet.

Near-field communications links typically are generally formed over distances of 20 cm or less (i.e., device 10 must be placed in the vicinity of the near-field communications reader for effective communications). These examples are merely illustrative and do not serve to limit the scope of the present invention. If desired, wireless communications circuitry 270 may be configured to support any suitable wireless communications protocols.

Wireless communications circuitry 270 may also include antennas. The antennas may be formed using any suitable antenna types. For example, the antennas may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna. In addition to supporting cellular telephone communications, wireless local area network communications, and other far-field wireless communications, the structures of the antennas may be used in supporting near-field communications. The structures of the antennas may also be used in gathering proximity sensor signals (e.g., capacitive proximity sensor signals).

Input-output circuitry 254 may also include an interface circuit 266 for linking applications processor 251 to external elements.

Secure enclave processor 252 may include one or more processors, a secure boot read-only memory (ROM), one or more security peripherals, and/or other components. The security peripherals may include hardware configured to assist in the secure services performed by processor 252, such as authentication hardware for implementing various user authentication techniques (e.g., a biometric sensor such as a fingerprint sensor, a retinal sensor, a palm sensor, a signature-identification sensor, just to name a few), encryption hardware configured to perform encryption, secure-interface controllers configured to communicate over the secure interface to other components, etc. Secure enclave processor 252 may only be accessed via a carefully controlled interface, thus forming a secure enclave for processor 252 and its peripheral components. Managed in this way, direct unauthorized access to components within secure enclave processor 252 may be prevented.

Figure 9:
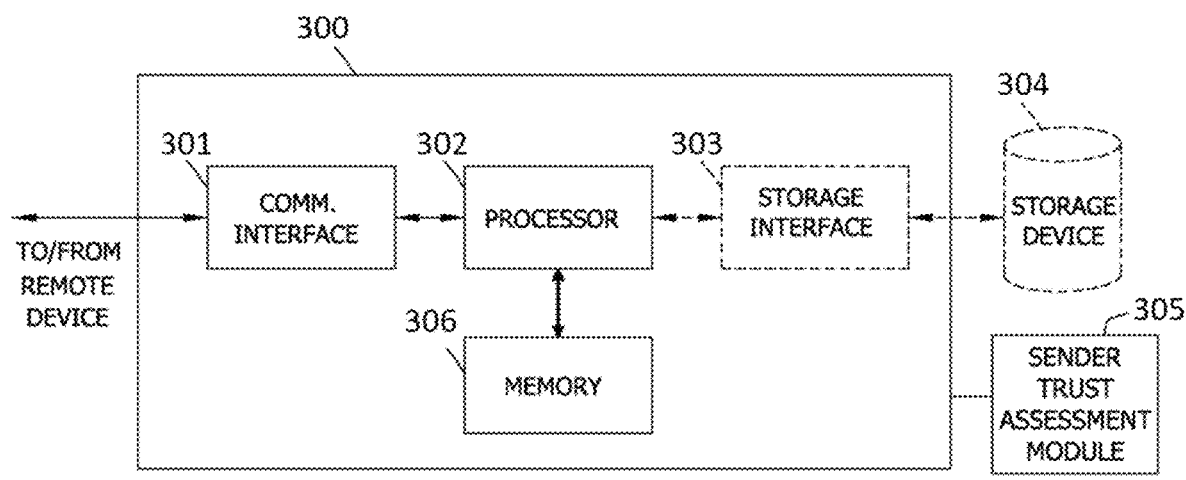
FIG. 9 is a schematic diagram of illustrative circuitry in an authentication server device in accordance with an embodiment.

FIG. 9 is a schematic diagram of illustrative circuitry in an authentication server device in accordance with an embodiment.

The authentication server device 300 may include, but is not limited to, a processor 302 for executing instructions. Instructions may be stored in a memory area 306, for example. Processor 302 may include one or more processing units (e.g., in a multi-core configuration) for executing instructions. The instructions may be executed within a variety of different operating systems on the authentication server device 300, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc).

The authentication server device 300 may be communicatively coupled to an external payment platform module, and/or an external transaction platform 38. The payment platform module in communication with the authentication server device 300 is configured to receive information relating to an item or service for sale by a merchant user, and store the information in a memory device as one of a plurality of information items for a plurality of items or services for sale. The payment platform module is also configured to transmit the information relating to an item or service for sale by a merchant user to selectable social media outlets associated with the merchant user. The payment platform module is further configured to enable selling of products and services over social media outlets. In the example embodiment, the payment platform module may be external to the authentication server device 300 and may be accessed by multiple authentication server devices 300. For example, the payment platform module may be a computing device coupled to a memory unit. In some embodiments, the payment platform module may be integrated with the authentication server device 300. For example, the payment platform module may be a specifically programmed section of the 34 configured to perform the functions described herein when executed by processor 302.

Processor 302 is operatively coupled to a communication interface 301 such that the authentication server device 300 is capable of communicating with a remote device such as a user system or another authentication server device 300. For example, communication interface 301 may receive requests from the portable terminal device 200 via the Internet, as illustrated in FIGS. 1 and 2.

Processor 302 may also be operatively coupled to a storage device 304. Storage device 304 is any computer-operated hardware suitable for storing and/or retrieving data. In some embodiments, storage device 304 is integrated in the authentication server device 300. For example, the authentication server device 300 may include one or more hard disk drives as storage device 304. In other embodiments, storage device 304 is external to the authentication server device 300 and may be accessed by a plurality of authentication server devices 300. For example, storage device 304 may include multiple storage units such as hard disks or solid state disks in a redundant array of inexpensive disks (RAID) configuration. Storage device 304 may include a storage area network (SAN) and/or a network attached storage (NAS) system.

In some embodiments, processor 302 is operatively coupled to storage device 304 via a storage interface 303. Storage interface 303 is any component capable of providing processor 302 with access to storage device 304. Storage interface 303 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 302 with access to storage device 304.

Memory area 306 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

In some embodiments, a mobile cross-authentication system may include the computer terminal device 100 shown in FIG. 7 and described above, the portable terminal device 200 shown in FIG. 8 and described above, and the authentication server device 300 shown in FIG. 9 and described above.

FIGS. 10A-10C are illustrations of devices displaying Ocode in accordance with embodiments.

In some embodiments, types of Ocode and Mcode may include numbers as shown in FIG. 10A, QR codes as shown in FIG. 10B, and barcodes as shown in FIG. 10C. Further, types of Ocode and Mcode may also include letters, and a combination of numbers and letters.

FIGS. 11A-11D are illustrations of devices displaying Mcode in accordance with embodiments.

In some embodiments, Mcode can be transmitted to a portable terminal device using various methods. For example, Mcode can be transmitted to a portable terminal device using a SMS message including numbers, as shown in FIG. 11A. Mcode can be transmitted to a portable terminal device using a SMS message including a QR code, as shown in FIG. 11B. Mcode can be transmitted to a portable terminal device using a SMS message including a URL that leads to a screen where a user can check Mcode generated by the authentication server device and enter Ocode displayed on a computer terminal.

When the portable terminal device is a smartphone, a user can install a mobile application for authentication to receive and transmit an authentication code, as shown in FIG. 11D.

Figure 12:
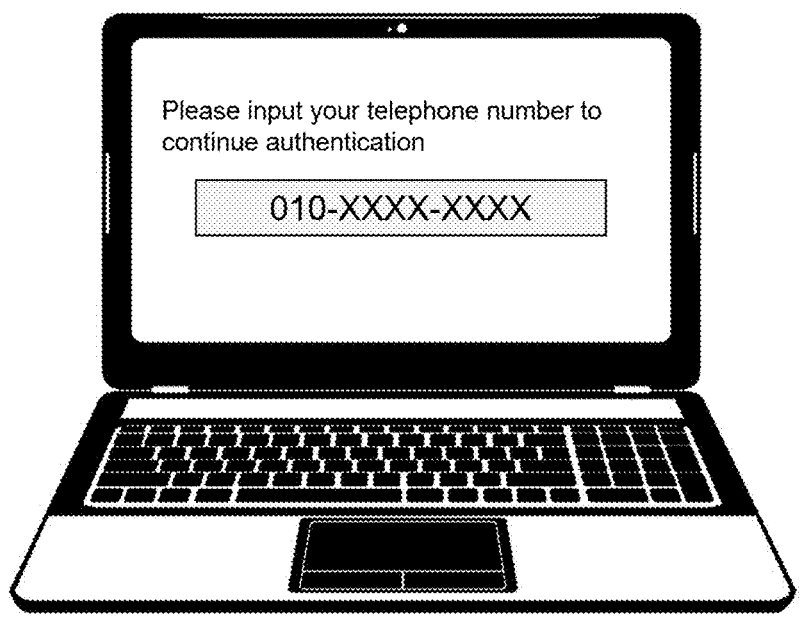
FIG. 12 is an illustration of a device displaying a request for a telephone number in accordance with an embodiment.

FIG. 12 is an illustration of a device displaying a request for a telephone number in accordance with an embodiment.

The computer terminal device transmits user's portable terminal identification information Tel_no by the request of the portable terminal identification information to the authentication server device.

In the above configuration of the system, the computer terminal device, the portable terminal device and the authentication server device are separated hardware devices that communicate with each other via a data communication network. The computer terminal device processor is configured to execute a first transmission instruction to transmit, to the authentication server device, an authentication request when the computer terminal device is configured to use a service that requires an online authentication. The authentication server device processor is configured to execute a first reception instruction to receive, from the computer terminal device, the authentication request, and to execute a request instruction to request, to the computer terminal device, a user's portable terminal device identification information, wherein the user's portable terminal device identification information comprises a telephone number of the portable terminal device. The computer terminal device processor is further configured to execute a second transmission instruction to transmit, to the authentication server device, the telephone number, in response to a request for the telephone number, received from the authentication server device. The authentication server device processor is further configured to execute a second reception instruction to receive, from the computer terminal device, the telephone number, to execute a generation instruction to generate an online authentication code (Ocode) and a mobile authentication code (Mcode), to execute a third transmission instruction to transmit the generated Ocode to the computer terminal device, and to execute a fourth transmission instruction to transmit the generated Mcode to the portable terminal device by using the portable terminal device identification information. For example, the authentication server device processor transmits, via wireless communication, the Mcode to the portable terminal device having an address matched with the portable terminal device identification information. Information to determine matching of the address with the portable terminal device identification information may be stored in the authentication server.

The portable terminal device processor is configured to execute a third reception instruction to receive, from the authentication server device, the Mcode, and displays the received Mcode. The computer terminal device processor is further configured to execute a fourth reception instruction to receive, from the authentication server device, the Ocode, and displays the received Ocode. The computer terminal device processor is further configured to execute a fifth reception instruction to receive a user input of the Mcode displayed on the portable terminal device, and to execute a fifth transmission instruction to transmit, to the authentication server device, the Mcode. The portable terminal device processor is further configured to execute a sixth reception instruction to receive a user input of the Ocode displayed on the computer terminal device, and to execute a sixth transmission instruction to transmit, to the authentication server device, the Ocode.

In some embodiments, when Ocode and Mcode have a format of numbers, those codes are displayed on screens of terminal devices, and a user may manually enter those codes into input windows displayed on terminal devices. In some other embodiments, when Ocode and Mcode have a format of barcodes (QR codes), camera modules of terminal devices may recognize the codes displayed on screens of terminal devices. For example, an image capture and an image recognition technologies can be used. In some other embodiments, when Ocode and Mcode have a format of a mixture of numbers and barcodes, a barcode part can be scanned by camera modules of terminal devices and a number part can be manually entered by a user. In some other embodiments, when Ocode and Mcode can be exchanged by terminal devices by using a wireless communication (e.g., Near-Field Communication (NFC) or Bluetooth or Wi-Fi).

Additionally, when entering Ocode, the portable terminal device can enter a message such as SMS and send it to the authentication server device, or receive a URL that leads to the authentication code input screen from the authentication server device and enter the authentication code on the mobile web. In addition, if the user's portable terminal device is a smartphone, a user can install a mobile application for authentication to receive and transmit an authentication code in the application.

Next, the authentication server device processor is further configured to execute instructions to: receive, from the computer terminal device, the Mcode, receive, from the portable terminal device, the Ocode, when the Ocode is received, detect a portable terminal device number (Dev_no) from the information with the received Ocode or look up a portable terminal device number (Dev_no) and retrieve the Dev_no from a database of the authentication server device, perform a first comparison of the Ocode received from the portable terminal device with the Ocode generated by the authentication server device, perform a second comparison of the Mcode received from the computer terminal device with the Mcode generated by the authentication server device, perform a third comparison of the Dev_no with the received portable terminal device identification information Tel_no, determine authentication success when all of the first comparison, the second comparison, and the third comparison are verified, determine authentication fail when at least one of the first comparison, the second comparison, and the third comparison is not verified, and transmit an authentication result according to the verifications to the computer terminal device; and the computer terminal device processor is further configured to execute a seventh reception instruction to receive of the computer terminal device receives, from the authentication server device, the authentication result, and to execute a display instruction to display the received authentication result.

In some embodiments, the portable terminal device processor is configured to execute instructions to: form a message including the Ocode, and transmit the formed message to the authentication server device, and the formed message is formed as one of mobile communication messages including a short message service (SMS) message, a long message service (LMS) message, and a multimedia message service (MMS) message, and smart phone push messages.

In some embodiments, the Ocode and the Mcode are configured to be generated as one-time random authentication codes and configured to be deleted when the Ocode and the Mcode are unused within a predetermined period from a generated time point thereof.

In some embodiments, the mobile cross-authentication system may perform: transmitting, by the computer terminal device processor, to the authentication server device, an authentication request when the computer terminal device is configured to use a service that requires an online authentication; receiving, by the authentication server device processor, from the computer terminal device, the authentication request; requesting, by the authentication server device processor, to the computer terminal device, a user's portable terminal device identification information, wherein the user's portable terminal device identification information comprises a telephone number of the portable terminal device; transmitting, by the computer terminal device processor, to the authentication server device, the telephone number, in response to a request for the telephone number, received from the authentication server device; receiving, by the authentication server device processor, from the computer terminal device, the telephone number; generating, by the authentication server device processor, an online authentication code (Ocode) and a mobile authentication code (Mcode); transmitting, by the authentication server device processor, the generated Ocode to the computer terminal device, and the generated Mcode to the portable terminal device by using the portable terminal device identification information; receiving, by the portable terminal device processor, from the authentication server device, the Mcode; displaying, by a display of the portable terminal device, the received Mcode; receiving, by the computer terminal device processor, from the authentication server device, the Ocode; displaying, by a display of the computer terminal device, the received Ocode; receiving, by the computer terminal device processor, a user input of the Mcode displayed on the portable terminal device; transmitting, by the computer terminal device processor, to the authentication server device, the Mcode; receiving, by the portable terminal device processor, a user input of the Ocode displayed on the computer terminal device; transmitting, by the portable terminal device processor, to the authentication server device, the Ocode; receiving, by the authentication server device processor, from the computer terminal device, the Mcode; receiving, by the authentication server device processor, from the portable terminal device, the Ocode; when the Ocode is received, detecting a portable terminal device number (Dev_no) from the information with the received Ocode or looking up, by the authentication server device processor, a portable terminal device identification information (Dev_no), and retrieving, by the authentication server device processor, the Dev_no from a database of the authentication server device; performing, by the authentication server device processor, a first comparison of the Ocode received from the portable terminal device with the Ocode generated by the authentication server device; performing, by the authentication server device processor, a second comparison of the Mcode received from the computer terminal device with the Mcode generated by the authentication server device; performing, by the authentication server device processor, a third comparison of the Dev_no with the received portable terminal device identification information Tel_no; determining, by the authentication server device processor, authentication success when all of the first comparison, the second comparison, and the third comparison are verified; determines, by the authentication server device processor, authentication fail when at least one of the first comparison, the second comparison, and the third comparison is not verified; transmitting, by the authentication server device processor, an authentication result according to the verifications to the computer terminal device; receiving, by the computer terminal device processor, from the authentication server device, the authentication result; and displaying, by the computer terminal device processor, the received authentication result.

Meanwhile, the present invention is not limited to the above-described exemplary embodiments and it may be easily understood by those skilled in the art that various modifications, changes, substitutions or additions may be made without departing from the spirit and scope of the invention. When the practice of such modifications, changes, substitutions or additions are within the scope of the appended claims, the technical idea should also be regarded as belonging to the present invention.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:
1. A mobile cross-authentication system comprising:
a computer terminal device comprising a computer terminal device processor and a computer terminal device memory storing computer terminal device instructions;
a portable terminal device comprising a portable terminal device processor and a portable terminal device memory storing portable terminal device instructions; and
an authentication server device comprising an authentication server device processor and an authentication server device memory storing authentication server device instructions, wherein:

the computer terminal device, the portable terminal device and the authentication server device are separated hardware devices that communicate with each other via a data communication network;

the computer terminal device processor, executing the computer terminal device instructions, causing, the computer terminal device to determine that using a service requires an online authentication, and in response to the determination, transmitting an authentication request to the authentication server device;

the authentication server device processor, executing the authentication server device instructions, causing the authentication server device to receive, from the computer terminal device, the authentication request, and to request from the computer terminal device, a user's portable terminal device identification information, wherein the user's portable terminal device identification information comprises a telephone number of the portable terminal device;

the computer terminal device processor, executing the computer terminal device instructions, causing the computer terminal device to transmit, to the authentication server device, the telephone number of the portable terminal device, in response to the request for the portable terminal device identification information, received from the authentication server device;

the authentication server device processor, executing the authentication server device instructions, causing the authentication server device to receive, from the computer terminal device, the telephone number of the portable terminal device, and generate an online authentication code (Ocode) and a mobile authentication code (Mcode), and to transmit the generated Ocode to the computer terminal device and the generated Mcode to the portable terminal device, wherein the Ocode and the Mcode are one-time random authentication codes and configured to be deleted when the Ocode and the Mcode are unused within a predetermined time threshold;

the portable terminal device processor, executing the portable terminal device instructions, causing the portable terminal device to receive, from the authentication server device, the Mcode, and to display the received Mcode;

the computer terminal device processor, executing the computer terminal device instructions, causing the computer terminal device to receive, from the authentication server device, the Ocode, and to display the received Ocode;

the computer terminal device processor, executing the computer terminal device instructions, causing the computer terminal device to receive a user input of the Mcode displayed on the portable terminal device, and to transmit, to the authentication server device, the Mcode;

the portable terminal device processor, executing the portable terminal device instructions, causing the portable terminal device to receive a user input of the Ocode displayed on the computer terminal device, and to transmit, to the authentication server device, the Ocode;

the authentication server device processor, executing the authentication server device instructions, causing the authentication server device to:
receive, from the computer terminal device, the Mcode,
receive, from the portable terminal device, the Ocode,
look up a portable terminal device number (Dev_no) in a database of the authentication server device and retrieve the Dev_no from the database,
compare the Ocode received from the portable terminal device with the Ocode generated by the authentication server device,
compare the Mcode received from the computer terminal device with the Mcode generated by the authentication server device,
compare the Dev_no with the received telephone number of the portable terminal device identification information,
generate an authentication result, wherein the authentication result comprises a successful or failed authentication in response to the comparison of the Qcode, the Mcode, and the Dev_no; and
transmit the authentication result to the computer terminal device; and the computer terminal device processor, executing the computer terminal device instructions, causing the computer terminal device to receive, from the authentication server device, the authentication result, and to display the received authentication result.

2. The mobile cross-authentication system of claim 1, wherein the data communication network is a mobile communication network through which mobile communication messages are transmitted, and wherein the portable terminal device processor, executing the portable terminal device instructions, causing the portable terminal device to:
form a message including the Ocode as one of mobile communication messages including a short message service (SMS) message, a long message service (LMS) message, and a multimedia message service (MMS) message, and smart phone push messages, and
transmit the formed message to the authentication server device via the mobile communication network.

3. A mobile cross-authentication method performed by a computer terminal device comprising a computer terminal device processor and a computer terminal device memory storing computer terminal device instructions, a portable terminal device comprising a portable terminal device processor and a portable terminal device memory storing portable terminal device instructions, and an authentication server device comprising an authentication server device processor and an authentication server device memory storing authentication server device instructions, the method comprising:
transmitting, by the computer terminal device, to the authentication server device, an authentication request upon determining that using a service requires an online authentication;
receiving, by the authentication server device, from the computer terminal device, the authentication request;
requesting, by the authentication server device, to the computer terminal device, a user's portable terminal device identification information, wherein the user's portable terminal device identification information comprises a telephone number of the portable terminal device;
transmitting, by the computer terminal device, to the authentication server device, the portable terminal device identification information, in response to the request for the portable terminal device identification information, received from the authentication server device;
receiving, by the authentication server device, from the computer terminal device, the telephone number;

generating, by the authentication server device, an online authentication code (Ocode) and a mobile authentication code (Mcode), wherein the Ocode and the Mcode are one-time random authentication codes, wherein the Ocode and the Mcode expire within a predetermined time threshold if not used;

transmitting, by the authentication server device, the generated Ocode to the computer terminal device, and the generated Mcode to the portable terminal device by using the portable terminal device identification information;

receiving, by the portable terminal device, from the authentication server device, the Mcode; and displaying the received Mcode on a display of the portable terminal device;

receiving, by the computer terminal device, from the authentication server device, the Ocode; and displaying the received Ocode on a display of the computer terminal device;

receiving, by the computer terminal device, a user input of the Mcode displayed on the portable terminal device; and transmitting to the authentication server device the received Mcode;

receiving, by the portable terminal device, a user input of the Ocode displayed on the computer terminal device; and transmitting the received Ocode to the authentication server device;

receiving, by the authentication server device, from the computer terminal device, the Mcode; and receiving, from the portable terminal device, the Ocode;

looking up, by the authentication server device processor, a portable terminal device number (Dev_no) in a database of the authentication server device using the received Ocode, and retrieving the Dev_no from the database;

comparing, by the authentication server device, the Ocode received from the portable terminal device with the Ocode generated by the authentication server device;

comparing, by the authentication server device, the Mcode received from the computer terminal device with the Mcode generated by the authentication server device;

comparing, by the authentication server device, the received Dev_no with the received telephone number of the portable terminal device identification information;

generating, by the authentication server device, an authentication result, wherein the authentication result comprises a successful or failed authentication in response to the comparison of the Ocode, the Mcode, and the Dev_no;

transmitting, by the authentication server device, an authentication result that comprises the authentication success or the authentication fail to the computer terminal device; and receiving, by the computer terminal device, from the authentication server device, the authentication result; and displaying the received authentication result.

4. A mobile cross-authentication system comprising:

a computer terminal device comprising a computer terminal device processor and a computer terminal device memory storing computer terminal device instructions;

a portable terminal device comprising a portable terminal device processor and a portable terminal device memory storing portable terminal device instructions; and an authentication server device comprising an authentication server device processor and an authentication server device memory storing authentication server device instructions, wherein:

the computer terminal device, the portable terminal device and the authentication server device are separated hardware devices that communicate with each other via a data communication network;

the computer terminal device processor, executing the computer terminal device instructions, causing the computer terminal device to determine that using a service requires an online authentication; and in response to the determination, to transmit an authentication request to the authentication server device;

the authentication server device processor, executing the authentication server device instructions, causing the authentication server device to receive, from the computer terminal device, the authentication request, and to request, from the computer terminal device, a user's portable terminal device identification information, wherein the user's portable terminal device identification information comprises a first telephone number of the portable terminal device;

the computer terminal device processor, executing the computer terminal device instructions, causing the computer terminal device to transmit, to the authentication server device, the telephone number of the portable terminal device, in response to the request for the portable terminal device identification information, received from the authentication server device;

the authentication server device processor, executing the authentication server device instructions, causing the authentication server device to receive, from the computer terminal device, the telephone number of the portable terminal device, to generate an online authentication code (Ocode) and a mobile authentication code (Mcode), to transmit the generated Ocode to the computer terminal device, and to transmit the generated Mcode to the portable terminal device by using the portable terminal device identification information, wherein the Ocode and the Mcode are one-time random authentication codes and configured to be deleted when the Ocode and the Mcode are unused within a predetermined time threshold;

the portable terminal device processor, executing the portable terminal device instructions, causing the portable terminal device to receive, from the authentication server device, the Mcode, and to display the received Mcode;

the computer terminal device processor, executing the computer terminal device instructions, causing the computer terminal device to receive, from the authentication server device, the Ocode, and to display the received Ocode;

the computer terminal device processor, executing the computer terminal device instructions, causing the computer terminal device to receive a user input of the Mcode displayed on the portable terminal device, and to transmit, to the authentication server device, the Mcode;

the portable terminal device processor, executing the portable terminal device instructions, causing the portable terminal device to receive a user input of the Ocode displayed on the computer terminal device, and to transmit, to the authentication server device, the Ocode;

the authentication server device processor, executing the authentication server device instructions, causing the authentication server device to:

receive, from the computer terminal device, the Mcode, receive, from the portable terminal device, the Ocode, in response to receiving the Ocode, obtain a portable terminal device number (Dev_no) by looking up and retrieving the Dev-no in a database of the authentication server device, wherein the portable terminal device number Dev_no comprises a second telephone number of the portable terminal device and further comprises any type of information that uniquely identifies the portable terminal device such as a device serial number, International Mobile Equipment Identity (IMEi), Mobile Equipment Identifier (MEID), compare the Ocode received from the portable terminal device with the Ocode generated by the authentication server device, compare the Mcode received from the computer terminal device with the Mcode generated by the authentication server device, compare the second telephone number of Dev-_no with the first telephone number of the user's portable terminal device identification information, generate an authentication result; therein the authentication result comprises a successful or failed authentication in response to the comparison of the Ocode, the Mcode, and the Dev_no; and transmit the authentication result to the computer terminal device; and the computer terminal device processor, executing the computer terminal device instructions, causing the computer terminal device to receive from the authentication server device, the authentication result, and to display the received authentication result.

* * * * *